(12) United States Patent
Forutanpour et al.

(10) Patent No.: US 9,473,611 B2
(45) Date of Patent: Oct. 18, 2016

(54) USE OF PROXIMITY SENSORS FOR INTERACTING WITH MOBILE DEVICES

(71) Applicant: QUALCOMM Incorporated, San Diego, CA (US)

(72) Inventors: Babak Forutanpour, San Diego, CA (US); Leonid Sheynblat, Hillsborough, CA (US); David L. Bednar, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 50 days.

(21) Appl. No.: 14/461,220

(22) Filed: Aug. 15, 2014

(65) Prior Publication Data
US 2014/0357251 A1 Dec. 4, 2014

Related U.S. Application Data

(63) Continuation of application No. 13/457,003, filed on Apr. 26, 2012, now Pat. No. 8,838,085.

(51) Int. Cl.
*H04M 1/60* (2006.01)
*H04M 1/725* (2006.01)

(52) U.S. Cl.
CPC ............ *H04M 1/605* (2013.01); *H04M 1/6008* (2013.01); *H04M 1/72563* (2013.01); *H04M 1/72583* (2013.01); *H04M 1/7253* (2013.01); *H04M 1/72569* (2013.01); *H04M 1/72586* (2013.01); *H04M 2250/12* (2013.01); *H04M 2250/22* (2013.01)

(58) Field of Classification Search
CPC ............ H04M 1/605; H04M 1/7253; H04M 1/72563
USPC ................ 455/418, 550.1, 566, 575.1, 575.2
See application file for complete search history.

(56) References Cited

U.S. PATENT DOCUMENTS

| | | | |
|---|---|---|---|
| 7,805,171 B2 | 9/2010 | Alameh et al. | |
| 8,004,493 B2 | 8/2011 | Herz et al. | |
| 2003/0122662 A1* | 7/2003 | Quinonez | B60N 2/002 340/457 |
| 2007/0075965 A1 | 4/2007 | Huppi et al. | |
| 2008/0111698 A1 | 5/2008 | Atherton | |
| 2009/0262078 A1 | 10/2009 | Pizzi | |
| 2010/0080084 A1 | 4/2010 | Chen et al. | |

(Continued)

FOREIGN PATENT DOCUMENTS

WO  WO-03100739 A1  12/2003

OTHER PUBLICATIONS

International Search Report and Written Opinion—PCT/US2013/036463—ISA/EPO—Feb. 12, 2014.

(Continued)

*Primary Examiner* — Sam Bhattacharya
(74) *Attorney, Agent, or Firm* — Kilpatrick Townsend & Stockton LLP

(57) ABSTRACT

Various arrangements for handling a call by a mobile device and/or selecting a function for execution by the mobile device are presented. A phone call may be commenced by a mobile device. During the phone call, the mobile device may collect proximity data that indicates the mobile device is not proximate to an ear of a user. The microphone of the mobile device may be muted in response to the proximity data that indicates the mobile device is not proximate to the ear of the user.

18 Claims, 10 Drawing Sheets

(56) References Cited

U.S. PATENT DOCUMENTS

2011/0086626 A1 4/2011 Kerr
2011/0319128 A1 12/2011 Miwa
2013/0288655 A1 10/2013 Foruntanpour et al.

OTHER PUBLICATIONS

Partial International Search Report—PCT/US2013/036463—International Search Authority European Patent Office Jun. 27, 2013.

* cited by examiner

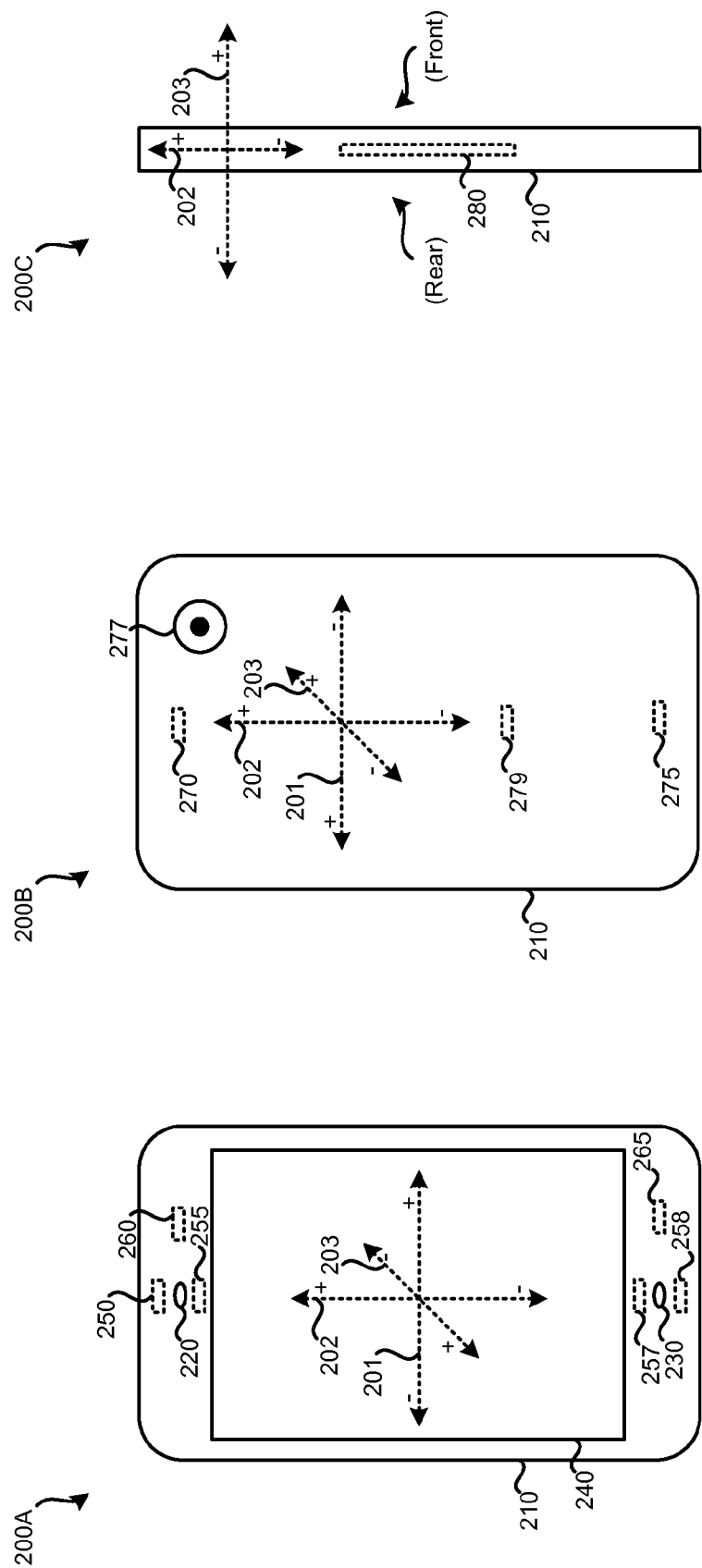

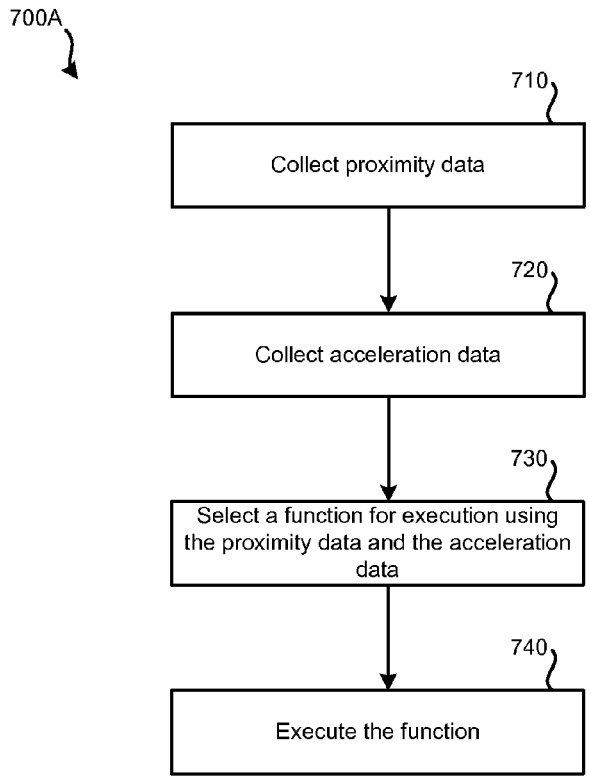
FIG. 7A
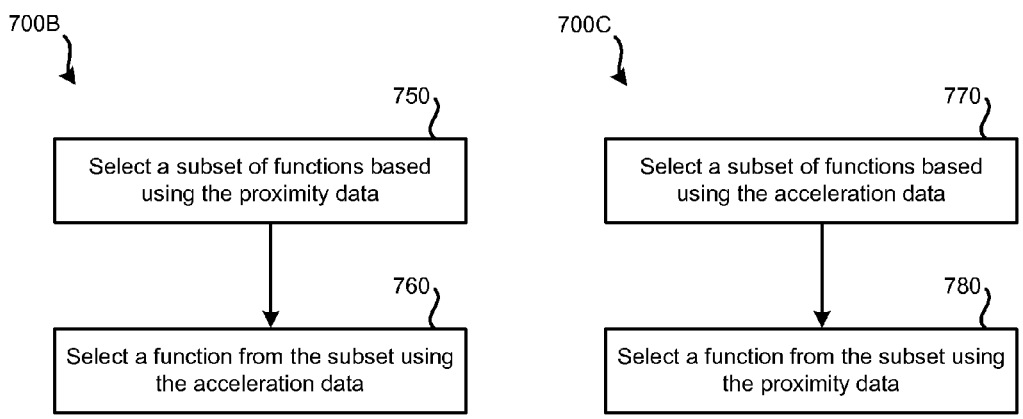
FIG. 7B  FIG. 7C

USE OF PROXIMITY SENSORS FOR INTERACTING WITH MOBILE DEVICES

CROSS REFERENCE TO RELATED APPLICATIONS

This application is a continuation of U.S. patent application Ser. No. 13/457,003, filed Apr. 26, 2012. This Application is hereby incorporated by reference for all purposes.

BACKGROUND

Mobile devices, such as smartphones, have become ubiquitous in many people's lives. Such mobile devices are used to store, access, and/or interact with vast quantities of locally and remotely stored information. To store, access, and/or interact with such information, a user of a mobile device may use various functions (e.g., applications) of the mobile device. Typically, in order to select a function for use, the user may need to perform a sequence, such as: activate a display of the mobile device, select the appropriate function using the display, and interact with the function being executed. At least some users may benefit from alternative ways of selecting a function for execution by a mobile device.

SUMMARY

In some embodiments, a method for handling a phone call using a mobile device is presented. The method may include commencing, by the mobile device, the phone call. The method may include during the phone call, collecting, by the mobile device, proximity data that indicates the mobile device is not proximate to an ear of a user. The method may include muting, by the mobile device, a microphone of the mobile device in response to the proximity data that indicates the mobile device is not proximate to the ear of the user.

Embodiments of such a method may include one or more of the following: The method may include, during the phone call, collecting, by the mobile device, acceleration data that indicates the mobile device is being held such that the face of the mobile device faces downward. Muting, by the mobile device, the microphone of the mobile device in response to the proximity data that indicates the mobile device is not proximate to the ear of the user may also be in response to the acceleration data. The proximity data may be received from a plurality of proximity sensors. The method may include a first proximity sensor of the plurality of proximity sensors is proximate to a speaker of the mobile device. The method may include a second proximity sensor of the plurality of proximity sensors is proximate to a microphone of the mobile device. The method may include a third proximity sensor of the plurality of proximity sensors is proximate to a grip location of the mobile device. The method may include, following muting the microphone of the mobile device, during the phone call, collecting, by the mobile device, additional proximity data that indicates the mobile device is proximate to the ear of the user. The method may include unmuting, by the mobile device, the microphone of the mobile device in response to the additional proximity data that indicates the mobile device is proximate to the ear of the user. The method may include during the phone call, collecting, by the mobile device, additional proximity data that indicates the mobile device is not being gripped by the user. The method may include enabling, by the mobile device, a speakerphone in response to the proximity data and the additional proximity data.

In some embodiments, a mobile device configured to handle a phone call is presented. The mobile device may include a proximity sensor. The mobile device may include a microphone. The mobile device may include a processor. The mobile device may include a memory communicatively coupled with and readable by the processor and having stored therein processor-readable instructions. The processor-readable instructions, which, when executed by the processor, cause the processor to, during the phone call, analyze proximity data from the proximity sensor that indicates the mobile device is not proximate to an ear of a user. The processor-readable instructions, when executed by the processor, may also be configured to cause the processor to mute the microphone in response to the proximity data that indicates the mobile device is not proximate to the ear of the user.

Embodiments of such a mobile device may include one or more of the following: The mobile device may include an accelerometer. The processor-readable instructions may further comprise processor-readable instructions, which, when executed by the processor, cause the processor to during the phone call, analyze acceleration data from the accelerometer that indicates the mobile device is being held such that the face of the mobile device faces downward. The processor-readable instructions that cause the processor to mute the microphone of the mobile device in response to the proximity data that indicates the mobile device is not proximate to the ear of the user may also be in response to the acceleration data. The mobile device may include plurality of proximity sensors, comprising the proximity sensor, a second proximity sensor, and a third proximity sensor. The proximity data may be received from the plurality of proximity sensors. The proximity sensor may be proximate to a speaker of the mobile device. The second proximity sensor may be proximate to a microphone of the mobile device. The third proximity sensor may be proximate to a grip location of the mobile device. The processor-readable instructions may further comprise processor-readable instructions, which, when executed by the processor, cause the processor to, following muting the microphone of the mobile device and during the phone call, collect additional proximity data that indicates the mobile device is proximate to the ear of the user. The processor-readable instructions, when executed by the processor, may also be configured to cause the processor to unmute the microphone of the mobile device in response to the additional proximity data that indicates the mobile device is proximate to the ear of the user. The processor-readable instructions may further comprise processor-readable instructions, which, when executed by the processor, cause the processor to, during the phone call, collect additional proximity data that indicates the mobile device is not being gripped by the user; and enable a speakerphone in response to the additional proximity data.

In some embodiments, a computer program product for handling a phone call on a mobile device is presented. The computer program product may comprise processor-readable instructions, which, when executed by the mobile device, cause the mobile device to, during the phone call, analyze proximity data from the proximity sensor that indicates the mobile device is not proximate to an ear of a user. The processor-readable instructions, when executed by the processor, may also be configured to cause the processor to mute the microphone in response to the proximity data that indicates the mobile device is not proximate to the ear of the user.

Embodiments of such a computer program product may include one or more of the following: The processor-readable instructions may further comprise processor-readable instructions, which, when executed by the processor, cause the processor to, during the phone call, analyze acceleration data from the accelerometer that indicates the mobile device is being held such that the face of the mobile device faces downward. The processor-readable instructions that cause the processor to mute the microphone of the mobile device in response to the proximity data that indicates the mobile device is not proximate to the ear of the user may also be in response to the acceleration data. The processor-readable instructions may further comprise processor-readable instructions, which, when executed by the processor, cause the processor to, following muting the microphone of the mobile device and during the phone call, collect additional proximity data wherein the additional proximity data indicates the mobile device is proximate to the ear of the user. The processor-readable instructions, when executed by the processor, may also be configured to cause the processor to unmute the microphone of the mobile device in response to the additional proximity data that indicates the mobile device is proximate to the ear of the user. The processor-readable instructions further comprise processor-readable instructions, which when executed by the processor, cause the processor to, during the phone call, collect additional proximity data that indicates the mobile device is not being gripped by the user. The processor-readable instructions, when executed by the processor, may also be configured to cause the processor to enable a speakerphone in response to the additional proximity data.

In some embodiments, an apparatus for handling a phone call on a mobile device is presented. The apparatus may include means for conducting the phone call. The apparatus may include means for collecting proximity data during the phone call, wherein the proximity data indicates the mobile device is not proximate to an ear of a user. The apparatus may include means for muting a microphone of the mobile device in response to the proximity data that indicates the mobile device is not proximate to the ear of the user.

Embodiments of such an apparatus may include one or more of the following: The apparatus may include means for collecting acceleration data during the phone call, wherein the acceleration data indicates the mobile device is being held such that the face of the mobile device faces downward. The means for muting the microphone of the mobile device in response to the proximity data that indicates the mobile device is not proximate to the ear of the user may also be in response to the acceleration data. The apparatus further comprising means for collecting additional proximity data, following muting the microphone of the mobile device and during the phone call, wherein the additional proximity data indicates the mobile device is proximate to the ear of the user. The apparatus may include means for unmuting the microphone of the mobile device in response to the additional proximity data that indicates the mobile device is proximate to the ear of the user. The apparatus may include means for collecting additional proximity data during the phone call. The additional proximity data may indicate the mobile device is not being gripped by the user. The apparatus may include means for enabling a speakerphone of the mobile device in response to the additional proximity data.

In some embodiments, a method for selecting a function for execution by a mobile device is presented. The method may include collecting, by the mobile device, proximity data. The method may include collecting, by the mobile device, acceleration data. The method may include selecting, by the mobile device, the function for execution using the proximity data and the acceleration data. The function may be selected from a set of functions configured to be executed by the mobile device.

Embodiments of such a method may include one or more of the following: Selecting the function for execution using the proximity data and the acceleration data may comprise selecting a subset of functions from the set of functions using the proximity data and selecting the function for execution from the subset of functions using the acceleration data. Selecting the function for execution using the proximity data and the acceleration data may comprise selecting a subset of functions from the set of functions using the acceleration data and selecting the function for execution from the subset of functions using the proximity data. The proximity data may indicate how the mobile device is being held by a user.

In some embodiments, a mobile device configured to select a function for execution may be presented. The mobile device may include a proximity sensor. The mobile device may include an accelerometer. The mobile device may include a processor. The mobile device may include a memory communicatively coupled with and readable by the processor and having stored therein processor-readable instructions. The processor-readable instructions which, when executed by the processor, cause the processor to analyze proximity data from the proximity sensor. The processor-readable instructions, when executed, may also cause the processor analyze acceleration data from the accelerometer. The processor-readable instructions, when executed, may also cause the processor select the function for execution using the proximity data and the acceleration data. The function may be selected from a set of functions configured to be executed by the mobile device.

Embodiments of such a mobile device may include or more of the following: The processor readable instructions configured to cause the processor to select the function for execution using the proximity data and the acceleration data may comprise processor-readable instructions configured, which, when executed by the processor, cause the processor to select a subset of functions from the set of functions using the proximity data and select the function for execution from the subset of functions using the acceleration data. The processor readable instructions configured to cause the processor to select the function for execution using the proximity data and the acceleration data may comprise processor-readable instructions configured, which, when executed by the processor, cause the processor to select a subset of functions from the set of functions using the acceleration data, and select the function for execution from the subset of functions using the proximity data. The processor readable instructions, which, when executed by the processor, are configured to cause the processor to analyze the proximity data may be further configured to cause the processor to determine how the mobile device is being held by a user using the proximity data.

In some embodiments, a computer program product for selecting a function for execution by a mobile device is presented. The computer program product may comprise processor-readable instructions, which, when executed by the mobile device, cause the mobile device to analyze proximity data collected by a proximity sensor. The processor-readable instructions, when executed, may also cause the processor analyze acceleration data collected by an accelerometer. The processor-readable instructions, when executed, may also cause the processor select the function for execution using the proximity data and the acceleration data. The function may be selected from a set of functions configured to be executed by the mobile device.

Embodiments of such a computer program product may include one or more of the following: The processor readable instructions configured to cause the processor to select the function for execution using the proximity data and the acceleration data may comprise processor-readable instructions configured, which, when executed by the processor, cause the processor to select a subset of functions from the set of functions using the proximity data and select the function for execution from the subset of functions using the acceleration data. The processor readable instructions, which, when executed by the processor, are configured to cause the processor to select the function for execution using the proximity data and the acceleration data may comprise processor-readable instructions configured, which, when executed by the processor, cause the processor to select a subset of functions from the set of functions using the acceleration data and select the function for execution from the subset of functions using the proximity data.

In some embodiments, an apparatus for selecting a function for execution by a mobile device is presented. The apparatus may include means for collecting proximity data. The apparatus may include means for acceleration data. The apparatus may include means for selecting the function for execution using the proximity data and the acceleration data. The function may be selected from a set of functions configured to be executed by the mobile device.

Embodiments of such an apparatus may include one or more of the following: The means for selecting the function for execution using the proximity data and the acceleration data may comprise means for selecting a subset of functions from the set of functions using the proximity data and means for selecting the function for execution from the subset of functions using the acceleration data. The means for selecting the function for execution using the proximity data and the acceleration data may comprise means for selecting a subset of functions from the set of functions using the acceleration data and means for selecting the function for execution from the subset of functions using the proximity data. The proximity data may indicate how the mobile device is being held by a user.

In some embodiments, a method for selecting a function for execution by a mobile device is presented. The method may include receiving, by the mobile device, an indication of the function being executed by a second mobile device. The method may include collecting, by the mobile device, proximity data. The method may include selecting, by the mobile device, the function for execution using the indication of the function being executed by the second mobile device and the proximity data.

Embodiments of such a method may include one or more of the following: Selecting, by the mobile device, the function for execution using the indication of the function being executed by the second mobile device and the proximity data may comprise selecting a subset of functions from a set of functions using the proximity data and selecting the function for execution from the subset of functions using the indication of the function being executed by the second mobile device. Selecting, by the mobile device, the function for execution using the indication of the function being executed by the second mobile device and the proximity data may comprise selecting a subset of functions from a set of functions using the indication of the function being executed by the second mobile device and selecting the function for execution from the subset of functions using the proximity data. Receiving the indication of the function being executed by the second mobile device may comprise receiving the indication via a peer-to-peer communication protocol.

In some embodiments, a mobile device configured to select a function for execution is presented. The mobile device may include a proximity sensor. The mobile device may include a processor. The mobile device may include a memory communicatively coupled with and readable by the processor and having stored therein processor-readable instructions. The processor-readable instructions, when executed by the processor, may cause the processor to receive an indication of the function being executed by a second mobile device. The processor-readable instructions, when executed by the processor, may cause the processor to receive proximity data from the proximity sensor. The processor-readable instructions, when executed by the processor, may cause the processor to select the function for execution using the indication of the function being executed by the second mobile device and the proximity data.

Embodiments of such a mobile device may include one or more of the following: The processor-readable instructions which, when executed by the processor, cause the processor to select the function for execution using the indication of the function being executed by the second mobile device and the proximity data further may comprise processor-readable instructions which, when executed by the processor, cause the processor to select a subset of functions from a set of functions using the proximity data and select the function for execution from the subset of functions using the indication of the function being executed by the second mobile device. The processor-readable instructions which, when executed by the processor, cause the processor to select the function for execution using the indication of the function being executed by the second mobile device and the proximity data further may comprise processor-readable instructions, which, when executed by the processor, cause the processor to select a subset of functions from a set of functions using the indication of the function being executed by the second mobile device; and select the function for execution from the subset of functions using the proximity data. The processor-readable instructions, which, when executed by the processor, cause the processor to receive the indication of the function being executed by the second mobile device may further comprise processor-readable instructions which, when executed by the processor, cause the processor to receive the indication via a peer-to-peer communication protocol.

In some embodiments, a computer program product for selecting a function for execution on a mobile device is presented. The computer program product may comprise processor-readable instructions, which, when executed by the mobile device, cause the mobile device to receive an indication of the function being executed by a second mobile device. The processor-readable instructions, when executed by the processor, may cause the mobile device to collect proximity data using a proximity sensor. The processor-readable instructions, when executed by the processor, may cause the mobile device to select the function for execution using the indication of the function being executed by the second mobile device and the proximity data.

Embodiments of such a computer program product may include one or more of the following: The processor-readable instructions which, when executed by the processor, cause the processor to select the function for execution using the indication of the function being executed by the second mobile device and the proximity data may further comprise processor-readable instructions which, when executed by the processor, cause the processor to select a subset of functions from a set of functions using the proximity data and select the function for execution from the subset of functions using the indication of the function being executed by the second mobile device. The processor-readable instructions which, when executed by the processor, cause the processor to select the function for execution using the indication of the function being executed by the second mobile device and the proximity data may further comprise processor-readable instructions which, when executed by the processor, cause the processor to select a subset of functions from a set of functions using the indication of the function being executed by the second mobile device and select the function for execution from the subset of functions using the proximity data. The processor-readable instructions which, when executed by the processor, cause the processor to receive the indication of the function being executed by the second mobile device may further comprise processor-readable instructions which, when executed by the processor, cause the processor to receive the indication via a peer-to-peer communication protocol.

In some embodiments, an apparatus for selecting a function for execution by a mobile device is presented. The apparatus may include means for receiving an indication of the function being executed by a second mobile device. The apparatus may include means for collecting proximity data. The apparatus may include means for selecting the function for execution using the indication of the function being executed by the second mobile device and the proximity data.

Embodiments of such an apparatus may include one or more of the following: The means for selecting the function for execution using the indication of the function being executed by the second mobile device and the proximity data may comprise means for selecting a subset of functions from a set of functions using the proximity data; and means for selecting the function for execution from the subset of functions using the indication of the function being executed by the second mobile device. The means for selecting the function for execution using the indication of the function being executed by the second mobile device and the proximity data may comprise: means for selecting a subset of functions from a set of functions using the indication of the function being executed by the second mobile device and means for selecting the function for execution from the subset of functions using the proximity data. The means for receiving the indication of the function being executed by the second mobile device may comprise means for receiving the indication via a peer-to-peer communication protocol.

In some embodiments, a method for selecting a function for execution by a mobile device is presented. The method may include collecting, by the mobile device, proximity data. The method may include selecting, by the mobile device, a subset of functions from a set of functions using the proximity data. The method may include displaying, by the mobile device, indications of the subset of functions.

Embodiments of such a method may include one or more of the following: The subset of functions may be selected from the set of functions based on each function of the subset of functions being associated with a position indicated by the proximity data. The position may be a grip position. The method may include receiving, by the mobile device, a selection of the function from the subset of functions. The method may include executing the function in response to the selection. The positions of the indications of the subset of functions may be at least partially based on the grip position indicated by the proximity data In some embodiments, a mobile device configured to select a function for execution may be presented. The mobile device may include a proximity sensor. The mobile device may include a touch screen display. The mobile device may include a processor. The mobile device may include a memory communicatively coupled with and readable by the processor and having stored therein processor-readable instructions. The processor-readable instructions, when executed by the processor, may cause the processor to receive proximity data from the proximity sensor. The processor-readable instructions, when executed by the processor, may cause the processor to select a subset of functions from a set of functions using the proximity data. The processor-readable instructions, when executed by the processor, may cause the processor to display, via the display, indications of the subset of functions.

Embodiments of such a mobile device may include one or more of the following: The subset of functions may be selected from the set of functions based on each function of the subset of functions being associated with a grip position indicated by the proximity data. The processor-readable instructions may further comprise processor-readable instructions, which, when executed by the processor, cause the processor to receive a selection via the touch screen display of the function from the subset of functions and execute the function in response to the selection.

In some embodiments, a computer program product for selecting a function for execution on a mobile device may be presented. The computer program product may comprise processor-readable instructions, which, when executed by the mobile device, cause the mobile device to receive proximity data from the proximity sensor. The processor-readable instructions, when executed by the processor, may cause the processor to select a subset of functions from a set of functions using the proximity data. The processor-readable instructions, when executed by the processor, may cause the processor to cause indications of the subset of functions to be displayed.

Embodiments of such a computer program product may include one or more of the following: The subset of functions may be selected from the set of functions based on each function of the subset of functions being associated with a grip position indicated by the proximity data. The processor-readable instructions further comprise processor-readable instructions, which, when executed by the processor, cause the processor to receive a selection via the touch screen display of the function from the subset of functions and execute the function in response to the selection.

In some embodiments, an apparatus for selecting a function for execution by a mobile device may be presented. The apparatus may include means for collecting proximity data. The apparatus may include means for selecting a subset of functions from a set of functions using the proximity data. The apparatus may include means for displaying indications of the subset of functions.

Embodiments of such an apparatus may include one or more of the following: The subset of functions may be selected from the set of functions based on each function of the subset of functions being associated with a grip position indicated by the proximity data. The apparatus may include means for receiving a selection of the function from the subset of functions. The apparatus may include means for executing the function in response to the selection.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A illustrates a front view of an embodiment of a mobile device configured to handle calls and/or select a function for execution.

FIG. 2B illustrates a rear view of an embodiment of a mobile device configured to handle calls and/or select a function for execution.

FIG. 2C illustrates a side view of an embodiment of a mobile device configured to handle calls and/or select a function for execution.

FIG. 7A illustrates an embodiment of a method for selecting a function for execution using acceleration and proximity data.

FIG. 7B illustrates an embodiment of a method for selecting the function to be performed from a subset of functions.

FIG. 7C illustrates another embodiment of a method for selecting the function to be performed from a subset of functions.

DETAILED DESCRIPTION

Figure 1:
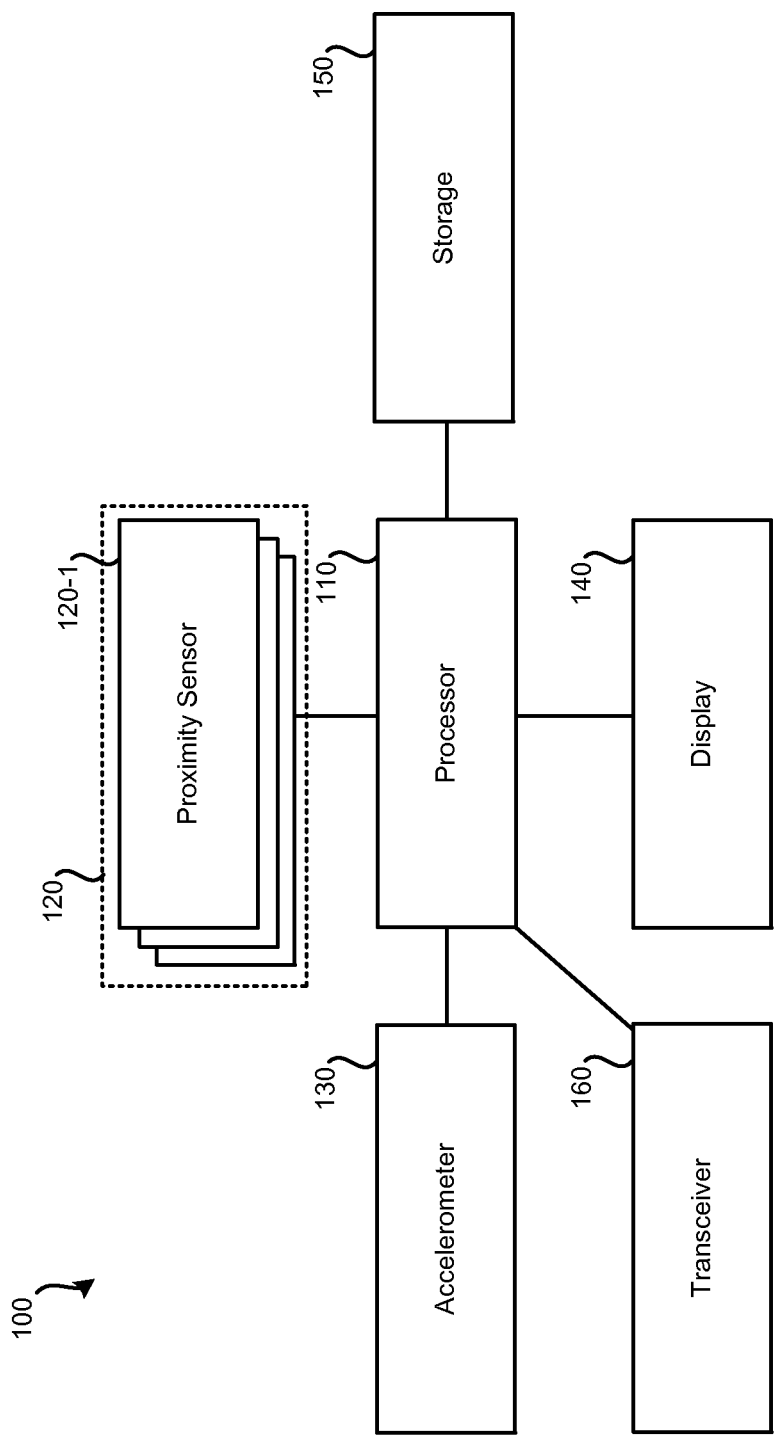
FIG. 1 illustrates an embodiment of a block diagram of a system configured to handle calls and/or select a function for execution on a mobile device.

Proximity data, that is, data that may indicate the presence of a triggering entity, such as a portion of a user's body, may be used to determine how a phone call should be handled by a mobile device (e.g., a smartphone, or, more generally, a cellular phone) and/or to select a function of the mobile device for execution. In a first set of embodiments, proximity data may be used alone or in combination with additional data, such as acceleration data received from an accelerometer, to determine when a microphone of a mobile device should be muted. As such, based on how a user is holding the mobile device may permit the user to mute the microphone of the mobile device without requiring a button or other input component of the mobile device to be used. For example, a user may move the mobile device away from the user's ear and/or point the face of the mobile device downward in order to mute the mobile device's microphone. Unmuting the mobile device may be performed in response to the user moving the mobile device back to the user's ear.

In a second set of embodiments, proximity data in combination with acceleration data may be used to determine a function (e.g., an installed application, a built-in function of the mobile device) to be executed. The function that is executed may vary based on whether the acceleration data indicates the user is moving. For example, if the user is holding the mobile device in a position that indicates the user is likely wanting to take a picture or capture a video, acceleration data may be used to decide whether a video or still image is likely desired. If the user is approximately motionless, the default selection may be a camera; if the user is moving, the default selection may be a video camera.

In a third set of embodiments, proximity data may be used in conjunction with data that indicates what functions other users are executing with their mobile devices. For example, if at a concert venue a majority of users who are holding their mobile devices with two hands (to allow typing with their thumbs) are using a social media network (such as to post indications of how great the concert is, updates to the set list, and/or photographs), based on proximity data indicating the user is holding the mobile device in the same manner and data indicating the behavior of other mobile devices are being used may be used to select a function associated with the social media network for execution. If other users in the vicinity of the mobile device had been executing a different function on their mobile devices while holding the mobile device, the function executed by the mobile device may have instead been this other function.

In a fourth set of embodiments, based on how a user is holding the mobile device may result in a subset of the functions available for execution by the mobile device being presented to the user. From this subset, the user may be permitted to select a particular function for execution. As an example, if a user is gripping a mobile device in a position that is associated with capturing either a picture or video (such as, holding the four corners of the mobile device), a display of functions available for execution by the mobile device may be culled to only functions associated with this grip of the user. As such, a subset of functions that indicates a still-image camera and video camera may be presented to the user. The user may then select the desired function for execution from the subset.

In addition to the above four sets of embodiments, other variations may exist. Further, the above-described sets of embodiments should not be considered exclusive, various combinations of the various sets of embodiments are possible. Additional detail regarding the various sets of embodiments are provided herein.

Proximity sensing can be used to detect when a triggering entity, such as a portion of a human body (e.g., finger, leg, ear, chest) is either 1) in contact with a proximity sensor or 2) near the proximity sensor (these two conditions being collectively referred to as proximate to the proximity sensor). One type of proximity sensor is a capacitive proximity sensor that detects changes in capacitance. Such a capacitive proximity sensor may include one or two electrodes. A dual-electrode capacitive proximity sensor may detect the presence of a portion of a human body by measuring changes in capacitance between the two electrodes. Use of a capacitive proximity sensor may have the advantage of being more likely to be triggered by a human body than by inanimate objects, such as being near or in contact with a piece of cloth or plastic. Further, because capacitive proximity sensors can be triggered if a portion of a human body is near but not touching the capacitive proximity sensor, the portion of the human body may trigger the capacitive proximity sensor through thin materials such as cloth (e.g., pants, gloves) and mobile device cases.

Proximity sensors, which may be capacitive proximity sensors, may be arranged on a mobile device to detect where the mobile device is located in relation to the body of a user. To do this, dual-electrode capacitive proximity sensors can be used. A first capacitive proximity sensor may be positioned such that its electrodes are on opposite sides of the mobile device in positions that are typically near where a user would grip the mobile device with a hand of the user. Such a capacitive proximity sensor may be used to determine when the mobile device is (likely) being gripped by a user. A second capacitive proximity sensor may have electrodes in proximity to a speaker of the mobile device. Such a capacitive proximity sensor may be used to determine when an ear of the user is (likely) near the speaker. A third capacitive proximity sensor may have electrodes on a same side of the mobile device (separated by a distance great enough to not likely be triggered by common pocket items that can affect capacitance, such as coins). This third capacitive proximity sensor may be used to sense when the mobile device is (likely) in a pocket of the user (e.g., in close proximity to the skin of the user through a material such as cloth). The fourth capacitive proximity sensor may be similar to the third capacitive sensor, but may be located on the opposite side of the mobile device. This fourth proximity sensor may be used similarly to the third sensor: for example, the user may place the mobile device in the user's pocket with the face of the mobile device either facing the user or away from the user. Data from such capacitive proximity sensors may be used to determine a location of the mobile device in relation to the user, such as: in the user's hand, in a pant or chest pocket of the user, not located on the user's body (e.g., in a purse or on a table), or held at the user's ear. Other positions may be determined.

The above locations of proximity sensors are not intended to be limiting. For example, proximity sensors may alternatively or additionally be arranged on a mobile device for use in accurately determining how a mobile device is being gripped. For example, when a user uses a mobile device to take a picture or video, the user may typically hold the mobile device by the four corners. Proximity sensors may be arranged on the mobile device to detect such a grip and, thus, be used in detecting when the user is holding the mobile device in a position associated with the capture of an image or video. Proximity sensors may also be positioned on the mobile device for use in identifying other grips. For example, other grips that may be identified include: holding the mobile device using two hands to allow typing with thumbs, holding the mobile device at an ear of the user, holding the mobile device away from an ear of the user, placing the mobile device down on a surface, etc.

Based upon data from proximity sensors, phone calls can be managed. For example, if a mobile device begins ringing, the ring may be muted as soon as the user grips the mobile device. The call may not be answered until the user places the mobile device to his or her ear. The volume of the ring may be controlled based on the relation between the mobile device and the user's body. For example, the ring may be quieter if the proximity sensors indicate the phone is likely in the user's pocket rather than further from the user (e.g., not against the user's body). Further, based on data from the proximity sensors, the mobile device may determine whether vibration or sound is likely be more effective in altering the user (such as to an incoming call). If one or more proximity sensors provides data indicating proximity to a leg or chest (e.g., in a pocket), vibration may be more likely to get the attention of the user. However, if no proximity sensors are triggered, the mobile device may be likely remote from a user and a ringer may be more effective. In some embodiments, to alert the user (e.g., to a text message or incoming call), the first attempt or attempts (e.g., the first "rings") may use a vibration and/or ringer, the user does not acknowledge the alert, additional attempts (e.g., later rings) may involve the use of louder rings and/or increased vibration (and/or a different vibration pattern) by the mobile device in response to proximity data gathered using proximity sensors of the mobile device.

In some embodiments, if the user is conducting a phone call using the mobile device, and the mobile device is moved away from the user's ear, the mobile device's microphone may automatically be muted. The microphone may unmute when the mobile device is again proximate to the user's ear. Further, in some embodiments, if a call is being conducted and the mobile device is no longer proximate to the user's body (e.g., was placed on a seat), a speakerphone may automatically be activated.

Additional data may be leveraged in conjunction with data from the proximity sensors. For example, other data that may be leveraged in conjunction with the data from the proximity sensors may include: location data, time of day data, speed data (e.g., whether the mobile device is moving), presence of ambient light, input from the microphone, mobile-to-mobile data, and user input data.

FIG. 1 illustrates an embodiment of a system 100 configured to handle calls and/or select a function for execution on a mobile device. System 100 includes: processor 110, proximity sensor 120, accelerometer 130, display 140, storage 150, and transceiver 160. System 100 may be part of a larger system. For example, system 100 may be part of a mobile device that contains additional components. For example, the mobile device that system 100 may be a part of may be a smartphone, a cellular phone, a tablet computer, a personal digital assistant, or gaming device, to name only a few examples. System 100 may be part of the computer system, such as computer system 1000 of FIG. 10.

Processor 110 may represent a general purpose or specialized processor configured to receive and process data from one or more sensors, such as proximity sensors 120 and accelerometer 130, interact with storage 150 and display 140, and communicate with transceiver 160.

Processor 110 may be in communication with proximity sensors 120. System 100 may include one or more proximity sensors 120. As such, some embodiments may have two, three, four, or more proximity sensors in communication with processor 110. Each proximity sensor, such as proximity sensor, 120-1, may include a single-electrode capacitive proximity sensor. In some embodiments, one or more of the proximity sensors may be dual-electrode capacitive proximity sensors. As such, each proximity sensor, such as proximity sensor 120-1, may include one or two electrodes. Each of these proximity sensors may periodically transmit data to processor 110 that indicates whether a triggering entity is within range of the proximity sensor. Each proximity sensor may also transmit a magnitude value that indicates how close a triggering entity is to the electrode(s) of the proximity sensor. The triggering entity may be any entity that causes the measured capacitance by the proximity sensor to vary. When being used by a user, the user's body may serve as the triggering entity. As such, a user's hand near a proximity sensor may be sensed by the proximity sensor. Such proximity sensors may be configured to determine when a triggering entity is in contact with the proximity sensor and when a triggering entity is close to the proximity sensor (collectively referred to as proximate). As such, for each proximity sensor of proximity sensors 120 to detect the presence of a triggering entity, the triggering entity does not need to be in direct contact with one or more electrodes of the proximity sensor.

While the above description of proximity sensors focuses on the use of capacitive proximity sensors, it should be understood that in some embodiments proximity sensors other than capacitive proximity sensors may be used. Further, some embodiments may use multiple types of proximity sensors; for example, a mobile device may contain both single-electrode and dual-electrode capacitive proximity sensors and/or other types of proximity sensors.

Processor 110 may also be in communication with one or more accelerometers, such as accelerometer 130. Accelerometer 130 may provide acceleration data to processor 110. Such acceleration data may indicate a direction of acceleration and a magnitude of acceleration. For example, at least when approximately still, the effect of gravity on accelerometer 130 may result in acceleration data from accelerometer 130 indicating a direction toward the ground and having a magnitude similar to the acceleration of gravity. In some embodiments, more accurate results may be achieved by receiving acceleration data from multiple accelerometers. Such data may be averaged or otherwise combined by processor 110.

Processor 110 may also be in communication with display 140. Display 140 may be used to visually present text and/or graphics to a user of a mobile device. Whether display 140 is active or inactive (e.g., turned on or off) may be based on data received from proximity sensors 120. For example, display 140 may be activated when proximity data from proximity sensors 120 indicate that the mobile device containing system 100 is being held in the hand of the user. If data from proximity sensors 120 indicate that the mobile device containing system 100 is being held in the hand of the user and is likely proximate to an ear of the user, display 140 may be inactivated because the user is unlikely to be viewing display 140. When data from proximity sensors 120 indicate that the mobile device has been moved away from in ear of the user, display 140 may be reactivated. As such, power consumed by display 140 may be decreased by decreasing the amount of time that display 140 is active.

Processor 110 may be able to read from and write data to storage 150. Storage 150 may be used to store an indication of which function of the mobile device should be activated based on various factors, such as how the user is gripping the mobile device. Storage 150 may be used to store an indication of which function is associated with which location in relation to the user.

Transceiver 160 may be in communication with processor 110. Transceiver 160 may be used to communicate with one or more wireless networks. Alternatively or additionally, transceiver 160 may be configured to communicate in a peer-to-peer arrangement with other mobile devices in the vicinity of the mobile device containing system 100. As such, it may be possible for system 100 to exchange data with other mobile devices that contain system 100 or a similar system. For example, information (also referred to as data) transmitted by transceiver 160 may relate to a function being executed or having been executed by the mobile device and, possibly, the associated grip position. Similar information may be received by transceiver 160.

FIG. 2A illustrates a front view of an embodiment of a mobile device 200A configured to handle calls and/or select a function for execution. Mobile device 200A may include system 100 of FIG. 1 or some other system configured to handle calls and/or select a function to be executed. As illustrated, the front of mobile device 200A is shown with display 240. Mobile device 200A may include case 210. Mobile device 200A may also include speaker 220 and microphone 230. Coupled with case 210 may be a plurality of proximity sensors, such as proximity sensors 250, 255, 257, 258, 260, and 265. Proximity sensors 250 and 255 may represent two single-electrode proximity sensors or two electrodes of a single dual-electrode proximity sensor. Proximity sensors 250 and 255 may be used to determine when the speaker of mobile device 200A is likely proximate to a user's ear. Proximity sensors 260 and 265 may represent two single-electrode proximity sensors or two electrodes of a single dual-electrode proximity sensor. Proximity sensors 260 and 265 may be used to determine when mobile device 200A is against the body of the user, such as in a shirt or pant pocket. Proximity sensors 260 and 265 may be represented from each other enough such that the presence of common pocket items, such as change and/or keys, is not mistaken for proximity to a user's body. Each proximity sensor is illustrated using dotted lines to indicate that each proximity sensor may not be visible external to the mobile device, rather each proximity sensor may be located within case 210 such that the proximity sensors are not visible to a user. In some embodiments, the proximity sensors may be arranged such as to be visible to users.

Proximity sensors 257 and 258, which may represent electrodes of a dual-electrode capacitive proximity sensor, may be in the vicinity of microphone 230 (e.g., on either side of the microphone). Data from such proximity sensors may be used to determine when the microphone is not in proximity to a user's mouth. During a phone call, when not in proximity to a user's mouth, the microphone may be muted. While muted, the user may still be able to listen to the call via speaker 220.

FIG. 2B illustrates a rear view of an embodiment of a mobile device configured to handle calls and/or select a function for execution. Mobile device 200B may be mobile device 200A of FIG. 2A viewed from a different perspective (e.g., from the rear of mobile device 200A such that display 240 is not visible). Coupled with the rear of case 210 may be a plurality of proximity sensors, such as proximity sensors 270 and 275. Proximity sensors 270 and 275 may represent two single-electrode proximity sensors or two electrodes of a single dual-electrode proximity sensor. Proximity sensors 270 and 275 may be used to determine when mobile device 200B is against the body of the user, such as in a shirt or pant pocket. Proximity sensors 270 and 275 may be separated from each other enough such that the presence of common pocket items, such as change and/or keys, is not mistaken for proximity to a user's body. Proximity sensors 270 and 275 are illustrated using dotted lines to indicate that each proximity sensor may not be visible, rather each proximity sensor may be located within case 210 such that the proximity sensors are not visible to a user. The number of proximity sensors on mobile device 200B is for example purposes only, more or fewer proximity sensors may be present on each side.

Also present on mobile device 200B is camera 277. Camera 277 may be used for capturing still images and/or video. Camera 277 may also be used for purposes such as augmented reality functions, video chat, etc. In some embodiments, alternatively or additionally, a front-facing camera may be present on mobile device 200A.

When camera 277 is being used, data from proximity sensors 270, 275, and/or 279 may be used to determine when to capture an image. For example, rather than requiring a user to provide input via a touch display to indicate that a picture is to be captured, proximity data from a proximity sensor, such as proximity sensor 279, may be used. This may be especially useful if the user is pointing camera 277 toward himself or herself. As such, proximity data may be used as a softkey: just as a user may tap a location on display 240 to capture an image, a user may tap in the vicinity of proximity sensors 270, 275, and/or 279 to capture an image.

FIG. 2C illustrates a side view of an embodiment of a mobile device configured to handle calls and/or select a function for execution. Mobile device 200C may be mobile device 200A of FIG. 2A and mobile device 200B of FIB. 2B viewed from a side, such as the left or right. Proximity sensor 280 may be present on mobile device 200C. Proximity sensor 280 may be a single-electrode capacitive proximity sensor or may represent an electrode of a dual-electrode proximity sensor. Another proximity sensor (or electrode of a dual capacitive proximity sensor) may be on the opposite side of mobile device 200C. As such, proximity to the region where a user typically grips the mobile device during use (e.g., conducting a phone call, reading email) may be sensed by proximity sensor 280 (and the complementary proximity sensor or electrode).

Also illustrated in FIGS. 2A through 2C are imaginary axes, represented by dotted arrows. Such axes are in a coordinate system of the mobile device. The direction of acceleration as detected by one or more accelerometers of a mobile device may be interpreted in accordance with such a coordinate system. Referring to FIG. 2A, x-axis 201 is positive to the right (as illustrated) and negative to the left (as illustrated). Y-axis 202 is positive toward the top (as illustrated) of mobile device 200A, and negative toward the bottom (as illustrated). Z-axis 203 passes through mobile device 200A as illustrated in FIG. 2C. The polarity of x-axis 201 and z-axis 203 appear reversed in FIG. 2B; this is because the mobile device is flipped and, as such, to remain in the coordinate system of the mobile device, these axes must also be flipped. FIG. 2C illustrates y-axis 202 and z-axis 203. In FIG. 2C, the front of the device containing display 240 (not shown) is on the right (as illustrated).

Acceleration data, as collected by an accelerometer, may indicate a direction in terms of the coordinate system of the mobile device indicated by the axes of FIGS. 2A-2C or some other coordinate system that similarly indicates a direction in relation to the mobile device. Such acceleration data may be used by itself or in conjunction with other data such as proximity data to identify where the mobile device is in relation to a user, such as how the user is gripping the mobile device. Depending on how the user is gripping the mobile device, the mobile device may be held at a different angle to the user, thus resulting in acceleration due to gravity occurring in a different direction in relation to the mobile device. For example, if the user is holding the mobile device with two hands such that the mobile device is in a position to allow typing with thumbs, the mobile device may be held at approximately a 45° angle to allow the user to type and view the display of the mobile device; if the user is attempting to capture video or a picture, the mobile device may typically be held vertically in front of the user, thus resulting in different acceleration data from when the mobile device is in a position to allow typing with the user's thumbs.

As detailed in relation to a first set of embodiments, proximity data and/or acceleration data, as gathered and analyzed by a system such as system 100, may be used to handle a phone call. FIG. 3A illustrates an embodiment 300A of a user conducting a phone call using a mobile device configured to handle calls using proximity and/or acceleration data. In embodiment 300A, user 310 is conducting a phone call using mobile device 320. Mobile device 320 is being held to an ear of user 310. In this position, one or more proximity sensors of mobile device 320 may collect proximity data indicating proximity to a triggering entity. If mobile device 320 is the same mobile device as illustrated in FIGS. 2A-2C, proximity data from proximity sensors 250 and 255 may indicate that speaker 220 of the mobile device is proximate to an ear of the user. Proximity data from proximity sensor 280 and, possibly, a proximity sensor on the opposite side of the mobile device, may indicate that the mobile device is being gripped by user 310. As such, when proximity data from proximity sensors 250, 255, and 280 indicate proximity to a triggering entity (and, possibly, proximity data from at least some other proximity sensors do not indicate proximity to a triggering entity), it may be determined that mobile device 320 is being held to an ear of user 310.

In some embodiments, acceleration data may also be used to determine that mobile device 320 is being held to an ear of user 310. For example, when a mobile device is held to an ear the a user, typically a speaker of the mobile device is positioned such that it is proximate to an ear of user 310, and a microphone of mobile device 320 is positioned such that it is proximate to the mouth of user 310. As such, mobile device 320 may be held at an angle when being held to an ear of the user. Acceleration data, which may indicate the direction of gravity, may be used to determine when mobile device 320 is being held at such an angle. In some embodiments, such acceleration data may be used without proximity data to determine that the mobile device is likely being held to an ear of the user. Referring to the axes of FIGS. 2A-2C, mobile device 320 being held at an angle while held to an ear of user 310 may result in acceleration due to gravity being measured along x-axis 201 and y-axis 202, with little acceleration due to gravity along z-axis 203.

Figure 3B:
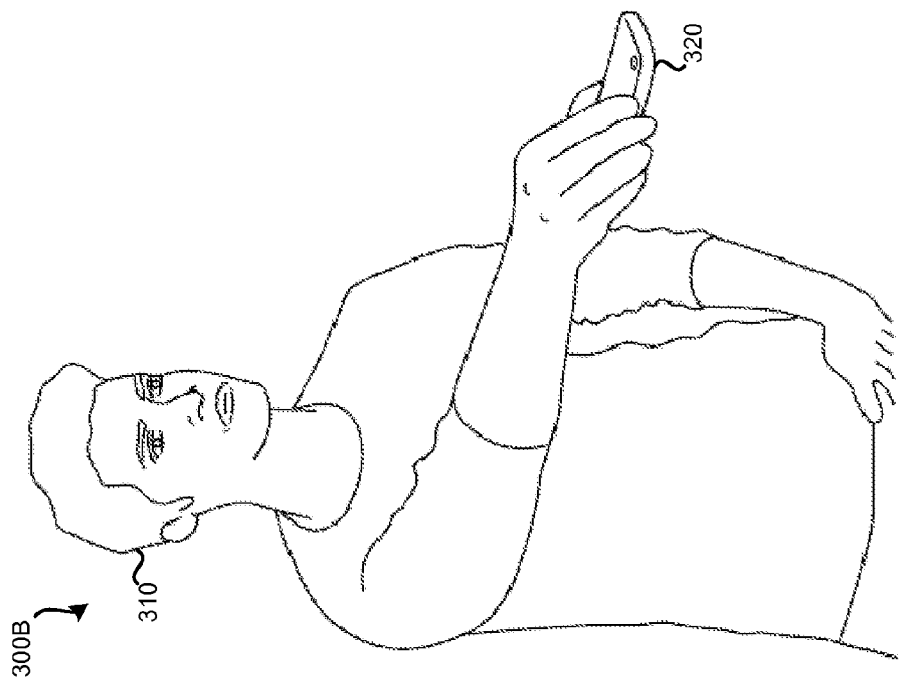
FIG. 3B illustrates an embodiment of a user muting a phone call using a mobile device configured to handle calls using proximity and/or acceleration data.
Figure 3A:
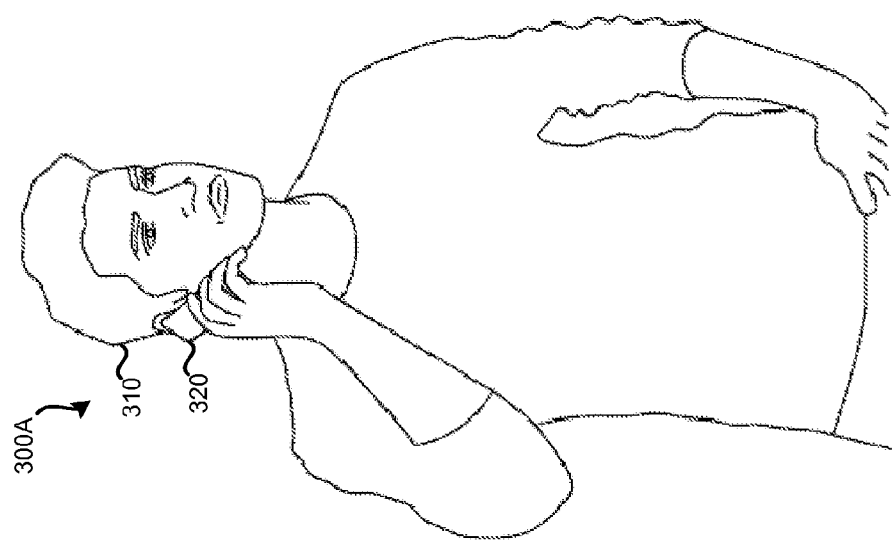
FIG. 3A illustrates an embodiment of a user conducting a phone call using a mobile device configured to handle calls using proximity and/or acceleration data.

FIG. 3B illustrates an embodiment 300B of user 310 muting a phone call using mobile device 320 configured to handle calls using proximity and/or acceleration data. In embodiment 300B, user 310 is holding mobile device 320 away from his ear. As such, in the position of embodiment 300B, proximity data gathered by mobile device 320 may indicate that user 310 is gripping mobile device 320 but that mobile device 320 is not located proximate to an ear of user 310. When such an arrangement is detected while user 310 is on a phone call, mobile device 320 may mute the microphone of mobile device 320. As such, by user 310 moving mobile device 320 away from his ear, user 310 may be able to mute a microphone to prevent the other party on the phone call from hearing user 310 or other sounds in the vicinity of user 310. User 310 may be able to unmute the phone call by moving mobile device 320 back to one of his ears.

In some embodiments, additionally or alternatively, acceleration data gathered by one or more accelerometers of mobile device 320 may be used to determine how to handle a phone call. When user 310 moves the mobile device 320 away from his ear, such as indicated in FIG. 3B, the mobile device may be held in a different orientation than when talking on the phone. As illustrated in FIG. 3B, mobile device 320 is being held by user 310 such that the face of mobile device 320 (that is, the side of mobile device 320 having the display, speaker, and microphone as illustrated in FIG. 2A), is approximately facing downward to the ground. As such, in some embodiments, for a phone call being conducted using mobile device 320 to be muted, proximity data may be required to indicate that mobile device 320 has been moved away from an ear of user 310 and/or acceleration data collected by mobile device 320 may be required to indicate that the mobile device is being held in an orientation either unlikely to be associated with a phone call or with an orientation associated with muting (e.g., facing downward, as illustrated). Such an arrangement where acceleration data is used in conjunction with proximity data may be useful such that if user 310 accidentally moves mobile device 320 away from his ear, the microphone of mobile device 320 is not muted (because, possibly, the mobile device has not been oriented in a direction associated with muting).

Other ways of handling a phone call based on proximity data and/or acceleration data may be possible. For example, if the user is conducting a phone call such as illustrated in FIG. 3A, and user 310 places mobile device 320 down on the surface (without terminating the phone call), a speakerphone of the mobile device may automatically be activated such that user 310 may continue the conversation. In such an arrangement, proximity data may indicate that the user is neither gripping the mobile device nor is the mobile device located proximate to an ear of the user. Additionally, acceleration data may be used to determine whether the face of the mobile device is facing upward or downward. The phone call may be handled differently based on whether the mobile device's face is facing upward or downward. For example, if the mobile device's face is facing upward, the phone call may be continued using a speakerphone of mobile device 320. If the face of the mobile device is facing downward, the phone call may be terminated or muted (which may be configured by the user).

Figure 4:
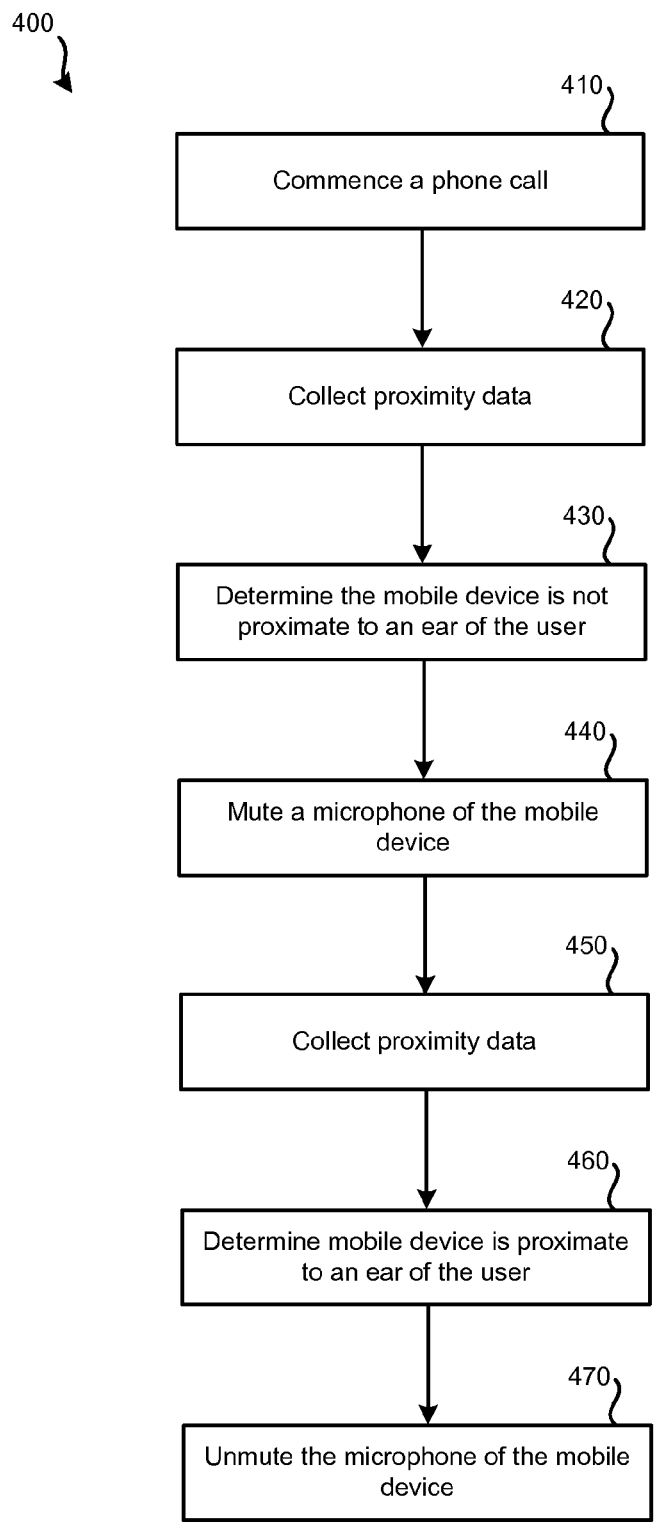
FIG. 4 illustrates an embodiment of a method for handling a phone call using proximity data.

Various methods may be performed using system 100 and the mobile devices of FIGS. 2A-3B. FIG. 4 illustrates an embodiment of a method for handling a phone call using proximity data. Method 400 may be performed using system 100 or some other system that is configured to handle calls and/or select a function for execution on a mobile device. The mobile device performing method 400 may be represented by the mobile devices of FIGS. 2A-3B or some other mobile device. Each step of method 400 may be performed by a mobile device and/or some component of a mobile device. As such, means for performing method 400 include a mobile device (e.g., a cellular phone, smartphone, gaming device, VoIP device) and components of such mobile devices, such as proximity sensors. For some of the various steps or all of method 400, a display of the mobile device may remain off At step 410, a phone call may be commenced. This may involve the mobile device receiving or placing a phone call. A user may provide input to the mobile device that indicates the phone call is to be accepted or placed. During the remainder of method 400, the phone call commenced at step 410 may be on-going.

At step 420, proximity data may be collected. Such proximity data may be collected using one or more proximity sensors. Such proximity sensors may include one or more of the following: single-electrode capacitive proximity sensors, dual-electrode capacitive proximity sensors, and/or other types of proximity sensors. Proximity data gathered by such proximity sensors may indicate whether or not a triggering entity, such as a part of the user's body, is proximate (touching or near) to the proximity sensor. Such proximity data may also indicate the magnitude. The magnitude may indicate how close the triggering entity, if present, is to the proximity sensor. A threshold value may be used for the magnitude such that if the magnitude is below the threshold, a triggering entity is not considered proximate to the proximity sensor; if the magnitude is greater than the threshold value, the triggering entity is considered proximate to the proximity sensor. Such proximity data may indicate whether the mobile device is likely proximate to an ear of the user and/or whether the mobile device is likely being gripped in a hand of the user. For example, proximity data from a proximity sensor located near a speaker of the mobile device that indicates proximity to a triggering entity may be used to determine the mobile device is proximate to an ear of the user; proximity data from a proximity sensor located where a user typically grips the mobile device may be used to determine the mobile device is being gripped by the user.

At step 430, it may be determined that the mobile device is not proximate to an ear of the user. Determining that the mobile device is not proximate to an ear of the user may involve determining that the mobile device is being gripped by the user using proximity data from one or more proximity sensors located where a user typically grips the mobile device and proximity data that indicates no triggering entity within proximity from one or more proximity sensors located where an ear of a user typically is located during use of the mobile device.

At step 440, in response to determining the mobile device is not proximate to an ear of the user, one or more microphones of the mobile device may be muted. While muted, other parties on the phone call may not be able to hear sound in the vicinity of the microphone because the microphone has been disabled. The microphone may remain muted, for example, unless a user unmutes the microphone, the phone call is ended, or the mobile device is determined to be against an ear of the user.

While the microphone is muted at step 440, proximity data may continue to be collected, such as at step 450. Based on proximity data collected at step 450, that is, while the microphone is muted, the mobile device may be determined to be proximate to an ear of the user. This may be considered an indication that the user desires the phone call to be unmuted. Determining that the mobile device is proximate to an ear of the user may involve determining that proximity data received at step 450 indicates the mobile device is proximate to an ear of the user (such as using proximity data from a proximity sensor located on the mobile device near where an ear of the user typically rests).

In response to determining the mobile device is proximate to an ear of the user at step 460, the microphone of the mobile device may be unmuted at step 470. As such, other parties on the phone call may now be able to hear sound in the vicinity of the microphone because the microphone has been enabled. If the mobile device is moved away from the user's ear again, step 430 through step 450 may repeat. If the mobile device is again moved back within proximity to the user's ear, steps 460 and 470 may also repeat. As such, on a single phone call, method 400 may be used to repeatedly mute and unmute a microphone of the mobile device.

Figure 5:
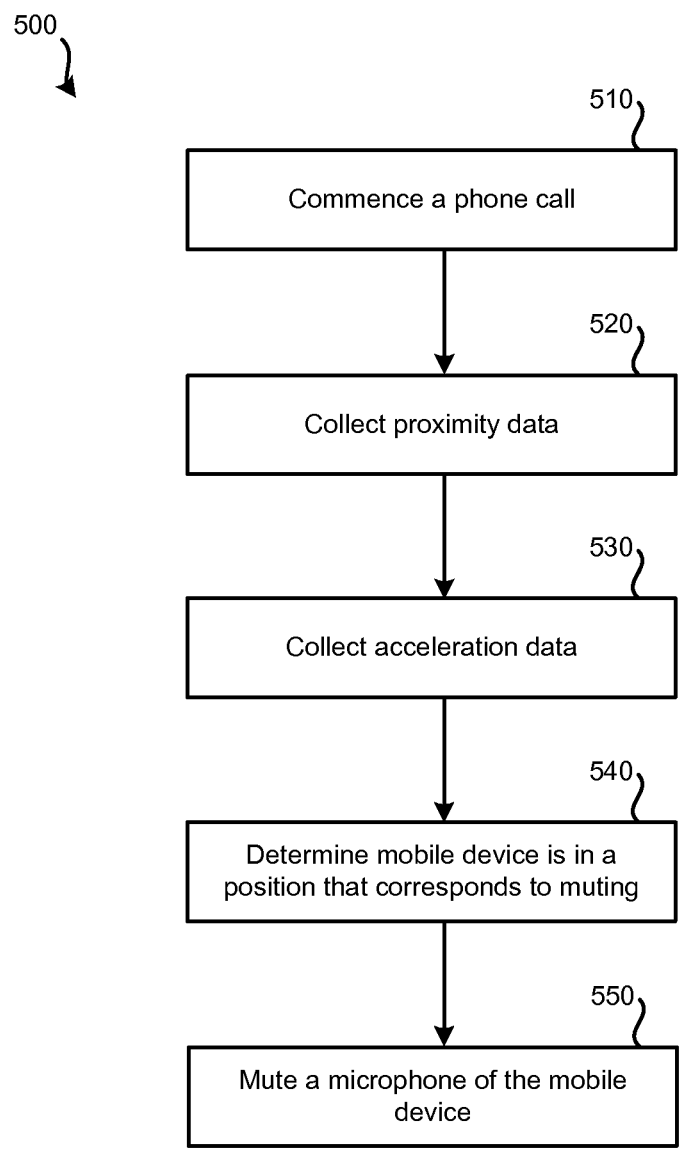
FIG. 5 illustrates an embodiment of a method for handling a phone call using proximity data and acceleration data.

FIG. 5 illustrates an embodiment of a method 500 for handling a phone call using proximity data and acceleration data. While method 400 focused on handling a call using proximity data, method 500 uses proximity data in conjunction with acceleration data. Method 500 may be performed using system 100 or some other system that is configured to handle calls and/or select a function for execution on a mobile device. The mobile device performing method 500 may be represented by the mobile devices of FIGS. 2A-3B or some other mobile device. Each step of method 500 may be performed by a mobile device and/or some component of a mobile device. As such, means for performing method 500 include a mobile device (e.g., a cellular phone, smartphone, gaming device, VoIP device) and components of such mobile devices, such as proximity sensors and/or accelerometers. For some of the various steps or all of method 500, a display of the mobile device may remain off. Method 500 may represent a more detailed embodiment of method 400 or an entirely separate method.

At step 510, a phone call may be commenced. This may involve the mobile device receiving or placing a phone call. A user may provide input to the mobile device that indicates the phone call is to be placed or accepted. During the remainder of method 500, the phone call commenced at step 510 may be on-going.

At 520, proximity data may be collected. Such proximity data may be collected using one or more proximity sensors. Such proximity sensors may include one or more of the following: single-electrode capacitive proximity sensors, dual-electrode capacitive proximity sensors, and/or other types of proximity sensors. Proximity data gathered by such proximity sensors may indicate whether or not a triggering entity, such as a part of the user's body, is proximate to the proximity sensor. Such proximity data may also indicate the magnitude. The magnitude may indicate how close the triggering entity, if present, is to the proximity sensor. A threshold value may be used for the magnitude such that if the magnitude is below the threshold a triggering entity is not considered proximate to the proximity sensor; if the magnitude is greater than the threshold value, the triggering entity is considered proximate to the proximity sensor. By adjusting the threshold value, sensitivity to triggering entities may be increased or decreased. As such, when sensitivity is decreased, a triggering entity may need to be closer to the proximity sensor to be identified as proximate; when sensitivity is increased, the triggering entity may be able to be farther from the proximity sensor to be identified as proximate.

Proximity data may indicate whether the mobile device is likely proximate to an ear of the user and/or whether the mobile device is likely being gripped in a hand of the user. For example, proximity data from a proximity sensor (e.g., proximity sensors 250 and 255 of FIG. 2A) located near a speaker (e.g., speaker 220 of FIG. 2A) of the mobile device that indicates proximity to a triggering entity may be used to determine whether the mobile device is proximate to an ear of the user; proximity data from a proximity sensor located where a user typically grips the mobile device (e.g., proximity sensor 280 of FIG. 2C) may be used to determine the mobile device is being gripped by the user.

At step 530, acceleration data may be collected. Such acceleration data may be collected by one or more accelerometers of the mobile device. The acceleration data gathered at step 530 may indicate a magnitude and/or a direction of acceleration. Based on the direction of acceleration of gravity, it may be possible to determine which direction is down (that is, pointing toward the center of the earth). Using a coordinate system of the mobile device, such as indicated by the axes of FIG. 2A-2C, the mobile device may be able to identify the direction of gravity in relation to the mobile device.

At step 540, it may be determined that the mobile device is in a position that corresponds to muting of a microphone of the mobile device. As an example, referring to FIG. 3B, embodiment 300B illustrates an example of such a position: user 310 is holding mobile device 320 away from the user's ear and facing downward. In some embodiments, these two conditions (away from the user's ear and facing downward) may need to be true for the microphone to be muted. This detailed position is for example purposes only: other positions may be configured as corresponding to the muting of the mobile device. Determining that the mobile device is not proximate to an ear of the user may involve determining that the mobile device is being gripped by the user using proximity data from one or more proximity sensors located where a user typically grips the mobile device and proximity data that indicates no triggering entity is within proximity to one or more proximity sensors located where an ear of a user typically is located during use of the mobile device. The direction of acceleration, as identified by the acceleration data collected at step 530, may be used to determine if the face of the mobile device is facing downward (or in some other direction). It should be understood that in some embodiments muting of the microphone of the mobile device may be based solely on acceleration data or proximity data, rather than a combination of proximity data and acceleration data. For example, whenever the mobile device is determined to be facing downward, the microphone of the mobile device may be muted. Similarly, as detailed in relation to method 400, if the mobile device is determined to be away from an ear of the user while remaining gripped by the user, the microphone of the mobile device may be muted.

At step 550, the microphone of the mobile device may be muted based on a determination made at step 540. As similarly detailed in relation to method 400, if the mobile device is moved out of the position that corresponds to muting of the microphone, the microphone may be unmuted. For instance, referring to FIGS. 3A and 3B, if user 310 moves the mobile device from the position illustrated in embodiment 300B to the position of mobile device 320 in embodiment 300A, the microphone may be unmuted. This transition may repeat as often as the user moves the mobile device into and out of the position associated with muting.

Figure 6:
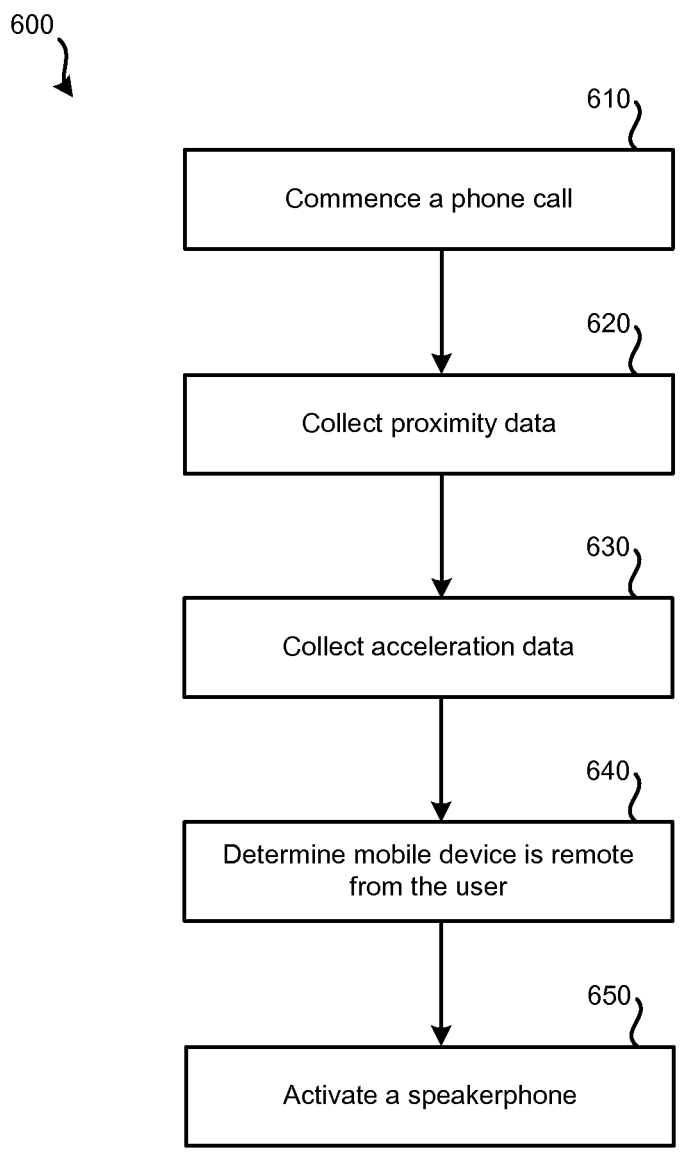
FIG. 6 illustrates another embodiment of a method for handling a phone call using proximity data and acceleration data.

While methods 400 and 500 are detailed in relation to muting (and unmuting) a phone call of a mobile device, it should be understood that similar principles may be applied to operations involving a mobile device other than muting (and unmuting) a microphone. For instance, referring to FIG. 3B, moving mobile device 320 to a position as illustrated may end the call, send a text message, or execute or cease execution of a function of the mobile device, to name a few examples. FIG. 6 illustrates similar principles being applied to activate a speakerphone of a mobile device.

FIG. 6 illustrates an embodiment of a method for handling a phone call using proximity data and acceleration data. While methods 400 and 500 focus on muting calls using proximity data (and, possibly, acceleration data), method 600 uses proximity data (possibly in conjunction with acceleration data) for activating a speakerphone of a mobile device. Method 600 may be performed using system 100 or some other system that is configured to handle calls and/or select a function for execution on a mobile device. The mobile device performing method 600 may be represented by the mobile devices of FIGS. 2A-3B or some other mobile device. Each step of method 600 may be performed by a mobile device and/or some component of a mobile device. As such, means for performing method 600 include a mobile device (e.g., a cellular phone, smartphone, gaming device, VoIP device) and components of such mobile devices, such as a speakerphone, proximity sensors and/or accelerometers. For some of the various steps or all of method 600, a display of the mobile device may remain off.

At step 610, a phone call may be commenced. This may involve the mobile device receiving or placing a phone call. A user may provide input to the mobile device that indicates the phone call is to be placed or accepted. During the remainder of method 600, the phone call commenced at step 610 may be on-going.

At 620, proximity data may be collected. Such proximity data may be collected using one or more proximity sensors. Proximity data gathered may indicate whether or not a triggering entity, such as a part of the user's body, is proximate to the one or more proximity sensors. Such proximity data may also indicate the magnitude. The magnitude may indicate how close the triggering entity, if present, is to the proximity sensor. A threshold value may be used for the magnitude such that if the magnitude is below the threshold a triggering entity is not considered proximate to the proximity sensor; if the magnitude is greater than the threshold value, the triggering entity is considered proximate to the proximity sensor. By adjusting the threshold value, sensitivity to triggering entities may be increased or decreased. As such, when sensitivity is decreased, a triggering entity may need to be closer to the proximity sensor to be identified is proximate; when sensitivity is increased, the triggering entity may be able to be farther from the proximity sensor to be identified as proximate.

Proximity data may indicate whether the mobile device is, for example, likely proximate to an ear of the user and/or whether the mobile device is likely being gripped in a hand of the user. For example, proximity data from a proximity sensor (e.g., proximity sensors 250 and 255 of FIG. 2A) located near a speaker (e.g., speaker 220 of FIG. 2A) of the mobile device that indicates proximity to a triggering entity may be used to determine whether the mobile device is proximate to an ear of the user; proximity data from a proximity sensor located where a user typically grips the mobile device (e.g., proximity sensor 280 of FIG. 2C) may be used to determine the mobile device is being gripped by the user. If proximity data from each proximity sensor of the mobile device indicates that a triggering entity is not proximate, it may be determined that the user is not holding or otherwise carrying the mobile device.

At step 630, acceleration data may be collected. Such acceleration data may be collected by one or more accelerometers located on the mobile device. The acceleration data gathered at step 630 may indicate a magnitude and/or a direction of acceleration. Based on the direction of acceleration due to gravity, it may be possible to determine which direction is down (that is, pointing to the center of the earth). Using a coordinate system of the mobile device, such as indicated by the axes of FIG. 2A-2C, the mobile device may be able to identify the direction of gravity in relation to the mobile device.

At step 640, it may be determined that the mobile device is remote from the user and that the speakerphone should be activated. This determination may involve using the proximity data collected at step 620 and/or the acceleration data collected at step 630. If a phone call is active (e.g., previously commenced and has not ended) and the mobile device is determined to be remote from the user due to no proximity sensor of the mobile device being proximate to a triggering entity, it may be determined a speakerphone of the mobile device should be activated.

Acceleration data may also be used to determine if the speakerphone should be activated. The speakerphone may be activated if the mobile device is placed down on a surface. As such, acceleration data may be used to determine if the mobile device has been placed in such position. More specifically, the speakerphone may only be activated if the mobile device is placed on a surface such that the face of the mobile device faces (at least approximately) upward. If the mobile device is placed such that the face of the mobile device faces (at least approximately) downward, another function may be performed, such as ending the phone call or muting a microphone of the mobile device. If acceleration data indicates that the mobile device is moving, the mobile device may be determined to not be located on a surface, and thus the speakerphone may not be activated.

In some embodiments, the determination made at step 640 may involve using proximity data and acceleration data collected at steps 620 and 630, respectively. For example, the determination made at step 640 may involve determining that the user is not proximate to the mobile device as indicated by the proximity data collected at step 620 and that the mobile device has been placed on a surface with the face of the mobile device facing upward. At step 650, a speakerphone of the mobile device may be activated. While method 600 is detailed in relation to activating a speakerphone of a mobile device, it should be understood that similar principles may be applied to operations involving a mobile device other than activating a speakerphone.

Rather than using proximity data and/or acceleration data to determine how to handle a phone call, similar data may be used to select a function of a mobile device for execution. FIG. 7A illustrates an embodiment of a method 700A for selecting a function for execution using acceleration and proximity data. Method 700A may be used for selecting a function to be performed at least based on: 1) how a mobile device is being held or otherwise positioned; and 2) if (and/or how) the mobile device is moving. Method 700A may be performed using system 100 or some other system that is configured to handle calls and/or select a function for execution on a mobile device. The mobile device performing method 700 may be represented by the mobile devices of FIGS. 2A-3B or some other mobile device. Each step of method 700A may be performed by a mobile device and/or some component of a mobile device. As such, means for performing method 700A include a mobile device (e.g., a cellular phone, smartphone, gaming device, VoIP device) and components of such mobile devices, such as a speakerphone, proximity sensors, and/or accelerometers. For some of the various steps or all of method 400, a display of the mobile device may remain off At 710, proximity data may be collected. Such proximity data may be collected using one or more proximity sensors of a mobile device. Proximity data gathered may indicate whether or not a triggering entity, such as a part of the user's body, is proximate to a proximity sensor. Such proximity data may also indicate the magnitude. The magnitude may indicate how close the triggering entity, if present, is to the proximity sensor. A threshold value may be used for the magnitude such that if the magnitude is below the threshold a triggering entity is not considered proximate to the proximity sensor; if the magnitude is greater than the threshold value, the triggering entity is considered proximate to the proximity sensor. By adjusting the threshold value, sensitivity to triggering entities may be increased or decreased. As such, when sensitivity is decreased, a triggering entity may need to be closer to the proximity sensor to be identified is proximate; when sensitivity is increased, the triggering entity may be able to be farther from the proximity sensor to be identified as proximate.

Proximity data may indicate whether the mobile device is, for example, likely proximate to an ear of the user and/or whether the mobile device is likely being gripped in a hand of the user. For example, proximity data from a proximity sensor (e.g., proximity sensors 250 and 255 of FIG. 2A) located near a speaker (e.g., speaker 220 of FIG. 2A) of the mobile device that indicates proximity to a triggering entity may be used to determine whether the mobile device is proximate to an ear of the user; proximity data from a proximity sensor located where a user typically grips the mobile device (e.g., proximity sensor 280 of FIG. 2C) may be used to determine the mobile device is being gripped by the user. Proximity data may also be used to determine if the mobile device is likely in a (shirt or pant) pocket of a user (e.g., proximity data from proximity sensors 260, 265, 270, and 275 of FIGS. 2A and 2B). If proximity data from each proximity sensor of the mobile device indicates that a triggering entity is not proximate, it may be determined that the user is not holding or otherwise carrying the mobile device.

At step 720, acceleration data may be collected. Such acceleration data may be collected by one or more accelerometers located on the mobile device. The acceleration data gathered at step 720 may indicate a magnitude and/or a direction of acceleration. Based on the direction of acceleration due to gravity, it may be possible to determine which direction is down (that is, pointing to the center of the earth). Using a coordinate system of the mobile device, such as indicated by the axes of FIG. 2A-2C, the mobile device may be able to identify the direction of gravity in relation to the mobile device. The acceleration data collected at step 720 may also be used to determine if the mobile device is moving or stationary. For example, when the mobile device is moving, the direction and magnitude of acceleration as measured by an accelerometer will vary (such as due to the user walking)

At step 730, a function may be selected for execution using the proximity data and the acceleration data. The proximity data may be used to determine how the mobile device is being gripped. The acceleration data may be used to determine where the mobile device is in relation to the user and/or if the mobile device is likely moving. For example, when a user takes a picture using a mobile device, the user may tend to hold the mobile device by the four corners of the mobile device. Based on proximity data that indicates that the mobile device is being held in this position, acceleration data may be used to determine if the mobile device is likely being used as a still image camera or a video camera. If acceleration data indicates the mobile device is substantially moving (greater than some threshold acceleration value), it may be determined that the user is likely desiring to capture video (because a still image would likely be blurry due to the movement of the mobile device). If acceleration data indicates the mobile device is substantially motionless (e.g., less than some threshold value), it may be assumed that the user likely desires to take a still image. In this example, whether a still image camera is selected or a video camera is selected, a user may switch the default selection if it is incorrect. At step 740, the function as selected at step 730 may be executed.

Methods 700B and 700C detail various embodiments of how step 730 of method 700A may be performed. FIG. 7B illustrates an embodiment of a method 700B for selecting the function to be performed from a subset of functions. At step 750, the proximity data collected at step 710 may be used to select a subset of functions from the functions available on the mobile device. The subset of functions selected using the proximity data may include functions that are linked with the grip of the mobile device indicated by the proximity data. For example, if the proximity data indicates proximity to a triggering entity by a first proximity sensor located near a speaker of the mobile device and proximity to a triggering entity by a second proximity sensor located near where a user would grip the mobile device, it may be determined that the mobile device is likely being held to an ear of the user. A subset of functions may be identified from a set of functions; the subset of functions may contain functions that may be performed by the user while the mobile device is gripped as indicated by the proximity data. Which grip is linked with which functions of the mobile device may be stored by the mobile device (and, possibly, may be customized by the user).

At step 760, if more than one function is present within the subset selected at step 750, acceleration data may be used to determine which function within the subset should be selected for execution. The acceleration data used at step 760 may be used to determine a position of the mobile device in relation to the user (e.g., whether the mobile device is being held in a portrait or landscape mode, being held by the four corners, being held at eye level, etc.). The acceleration data may also be used for determining whether the mobile device is moving or (at least approximately) stationary. Referring to the previous example of selection between a still image camera and a video camera, the proximity data received at step 750 may be used to select a subset of functions that contains the still image camera function and the video camera function. At step 760, acceleration data may be used to select the still image camera or the video camera from the subset. If the mobile device is moving, the video camera may be selected; if the mobile device is approximately still, the camera may be selected. Which function is selected from the subset may also be based on where the mobile device is positioned in relation to the user.

In method 700B, proximity data is used to identify a subset of functions and acceleration data is used to select a function from the subset. In method 700C, the opposite arrangement is present: acceleration data is used to identify a subset of functions and proximity data is used to select a function from the subset. FIG. 7C illustrates another embodiment of a method 700C for selecting the function to be performed using a subset of functions.

At step 770, the acceleration data collected at step 720 may be used to select a subset of functions from the functions available on the mobile device. The subset of functions selected using the acceleration data may include functions that are linked with a position of the mobile device or whether the mobile device is determined to be in motion. A subset of functions may be identified from a set of functions, the subset of functions contains functions that may be performed by the user while the mobile device is moving or not moving and/or as positioned in relation to the user. Which functions of the mobile device are linked with which positions and/or motion may be stored by the mobile device (and, possibly, may be customized by the user).

At step 780, if more than one function is present within the subset selected at step 750, proximity data may be used to determine which function within the subset should be selected for execution. The proximity data used at step 780 may be used to determine how the user is gripping the mobile device.

Figure 8A:
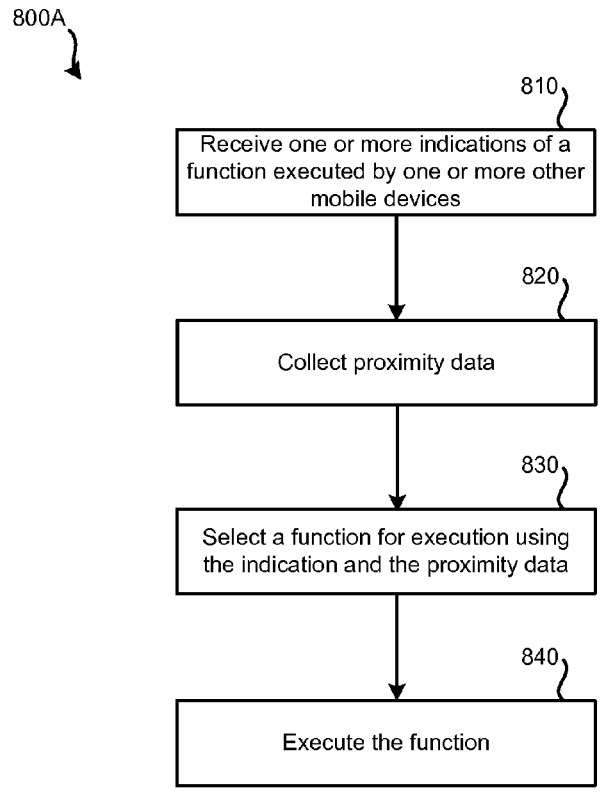
FIG. 8A illustrates an embodiment of a method for selecting a function for execution using proximity data and data from another mobile device.

Proximity data may be used in conjunction with indications received from one or more other mobile devices to determine a function to be executed by a mobile device. FIG. 8A illustrates an embodiment of a method 800A for selecting a function for execution using proximity data and data from one or more additional mobile devices. Method 800 may be performed using system 100 or some other system that is configured to handle calls and/or select a function for execution on a mobile device. The mobile device performing method 800 may be represented by the mobile devices of FIGS. 2A-3B or some other mobile device. Each step of method 800 may be performed by a mobile device and/or some component of a mobile device. As such, means for performing method 800 include a mobile device (e.g., a cellular phone, smartphone, gaming device, VoIP device) and components of such mobile devices, such as proximity sensors, transceivers, and/or accelerometers. For some of the various steps or all of method 400, a display of the mobile device may remain off.

At step 810, an indication of a function executed by a second mobile device (and possibly additional mobile devices) may be received. Such an indication may be received directly from the second mobile device, such as via a peer-to-peer communication protocol. Such an indication may also be received from the second mobile device via a wireless network. For example, the second mobile device may provide an indication to a host computer system of a wireless network. The host computer system may then transmit the indication to the (first) mobile device. This indication may be part of data that indicates a function executed by multiple other mobile devices. The indication of the function received by the mobile device may indicate, or otherwise be associated with, a particular grip position. As such, an indication may identify: 1) a function and 2) a grip position. Alternatively, only the function may be identified, and the receiving mobile device may determine which grip position the function is associated with. For example, if a user is interacting with an application for a social media network, the user may typically hold the mobile device with two hands such that typing can be done with the user's thumbs. The mobile device may receive an indication that other users are using the social media network, and, possibly, the grip they are using to interact with the social media network.

At step 820, proximity data may be collected. Such proximity data may be collected using one or more proximity sensors of a mobile device. Proximity data gathered may indicate whether or not a triggering entity, such as a part of the user's body, is proximate to one or more proximity sensors. Such proximity data may also indicate a magnitude. The magnitude may indicate how close the triggering entity, if present, is to the proximity sensor. A threshold value may be used for the magnitude such that if the magnitude is below the threshold, a triggering entity is not considered proximate to the proximity sensor; if the magnitude is greater than the threshold value, the triggering entity is considered proximate to the proximity sensor. By adjusting the threshold value, sensitivity to triggering entities may be increased or decreased. As such, when sensitivity is decreased, a triggering entity may need to be closer to the proximity sensor to be identified as proximate; when sensitivity is increased, the triggering entity may be able to be farther from the proximity sensor to be identified as proximate.

Proximity data may indicate whether the mobile device is likely proximate, for example, to an ear of the user and/or whether the mobile device is likely being gripped in a hand of the user. For example, proximity data from a proximity sensor (e.g., proximity sensors 250 and 255 of FIG. 2A) located near a speaker (e.g., speaker 220 of FIG. 2A) of the mobile device that indicates proximity to a triggering entity may be used to determine whether the mobile device is proximate to an ear of the user; proximity data from a proximity sensor located where a user typically grips the mobile device (e.g., proximity sensor 280 of FIG. 2C) may be used to determine the mobile device is being gripped by the user. Proximity data may also be used to determine if the mobile device is likely in a (shirt or pant) pocket of a user (e.g., proximity data from proximity sensors 260, 265, 270, and 275 of FIGS. 2A and 2B). If proximity data from each proximity sensor of the mobile device indicates that a triggering entity is not proximate, it may be determined that the user is not holding or otherwise carrying the mobile device.

At step 830, a function may be selected for execution using the indication received at step 810 and the proximity data collected at step 820. As such, how the user is gripping the mobile device and what other users, such as users nearby to the user using the mobile device, are using their mobile devices for may be used to select a function for execution. As an example of this, consider a concert: hundreds or thousands of people may be located within a concert venue listening to a band. During the performance, many users may use their mobile devices to post pictures or updates to a social media network. An indication of this function, the social media network, being executed by the mobile devices, may be indicated to other mobile devices (either using a peer-to-peer arrangement or via a wireless network). As such, if a user grips the mobile device in a way typically associated with use of the social media network, the mobile device may execute the function associated with the social media network because people in the vicinity of the user are using the social media network and the grip of the user indicates that the user may be desiring to use the social media network. At step 840, the function may be executed.

Figure 8B:
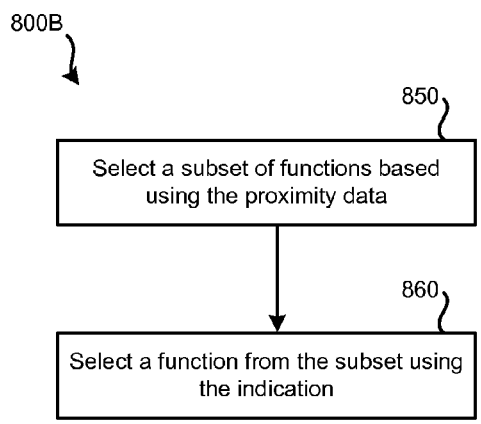
FIG. 8B illustrates an embodiment of a method for selecting the function to be performed from a subset of functions.

Method 800B or method 800C may be performed as step 830 of method 800A of FIG. 8A. In method 800B, proximity data is used to identify a subset of functions and indications from one or more other mobile devices to select a function from the subset. In method 800C, the opposite arrangement is present: indications from one or more other mobile devices are used to identify a subset of functions and proximity data is used to select a function from the subset. FIG. 8B illustrates an embodiment of a method 800B for selecting the function to be performed using a subset of functions.

At step 850, the proximity data collected at step 820 may be used to select a subset of functions from the functions available on the mobile device. The subset of functions selected using the proximity data may include functions that are linked with the grip of the mobile device indicated by the proximity data. For example, if the proximity data includes proximity data that indicates proximity to a triggering entity by a first proximity sensor located near a speaker of the mobile device and proximity to a triggering entity by a second proximity sensor located near where a user would grip the mobile device, it may be determined that the mobile device is likely being held to an ear of the user. A subset of functions may be identified from a set of functions, the subset of functions contains functions that may be performed by the user while the mobile device is gripped as indicated by the proximity data. Which grip is linked with which functions of the mobile device may be stored by the mobile device (and, possibly, may be customized by the user).

At step 860, if more than one function is present within the subset selected at step 850, indications received from one or more other mobile devices may be used to determine which function within the subset should be selected for execution. The indications used at step 860 may be used to determine what functions other users, such as other users in the vicinity of the user, are executing or have recently executed. The user may override the selection of the function made at step 860. The indications used at step 860 may be received in the form of statistics or other data from a server of a wireless network that indicates what functions multiple other mobile devices (which may be in the vicinity of the user) are executing or have recently executed. Whether other mobile devices are considered to be in the vicinity of the mobile device may be based on a threshold distance between the mobile devices, such as 500 ft, 1 mile, 5 miles, etc. In a peer-to-peer arrangement, the threshold distance may be defined by the range of the peer-to-peer communication arrangement used (e.g., Bluetooth, WiFi Direct).

Figure 8C:
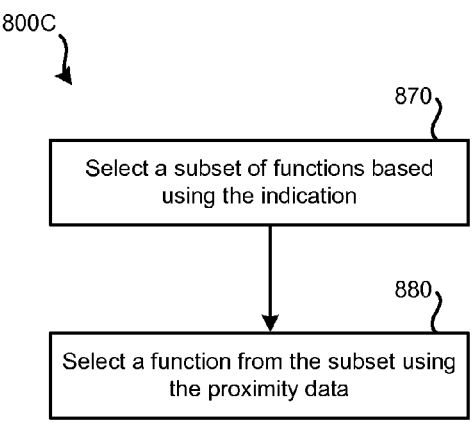
FIG. 8C illustrates another embodiment of a method for selecting the function to be performed from a subset of functions.

FIG. 8C illustrates another embodiment of a method for selecting the function to be performed using a subset of functions. At step 870, the one or more indications received at step 810 may be used to select a subset of functions from the functions available on the mobile device. The subset of functions selected using the one or more indications may include functions are being used by other users via the one or more other mobile devices. A subset of functions may be identified from a set of functions, the subset of functions contains functions that may likely be performed by the user based on the indications received at step 810. The indications used at step 870 may be received in the form of statistics or other data from a server of a wireless network that indicates what functions multiple other mobile devices (which may be in the vicinity of the user) are executing or have recently executed. Whether other mobile devices are considered to be in the vicinity of the mobile device may be based on a threshold distance between the mobile devices, such as 500 ft, 1 mile, 5 miles, etc. In a peer-to-peer arrangement, the threshold distance may be defined by the range of the peer-to-peer communication arrangement used (e.g., Bluetooth, WiFi Direct).

At step 880, if more than one function is present within the subset selected at step 870, proximity data may be used to select a function from the subset of functions. The functions present within the subset of functions may each be linked with one or more particular grips. (Certain functions may be more likely to be performed based on how the mobile device is being held.) Based on the proximity data received at step 820, it may be determined how the user is holding the mobile device. Using this information, the function may be selected from the subset selected at step 870. For example, if the subset comprises a social media network function (the mobile device being typically held in landscape mode with two hands to allow typing with the user's thumbs) and a camera function (the mobile device being typically held in portrait mode with one hand), the function to be executed may be selected based on proximity data collected by the mobile device that indicates how the mobile device is being held.

In methods 800A through 800C, it should be understood that acceleration data may also be used to determine which function should be executed. Such acceleration data, gathered by one or more accelerometers on the mobile device, may be used to determine a position of the mobile device in relation to the user, such as an angle at which the user is holding the mobile device. For example, if a mobile device is being held at a 45 degree angle, typically the user may be typing on the mobile device; if held such that the camera points directly in front of the user, the user may typically be capturing an image or video or using an augmented reality function of the mobile device.

Figure 9:
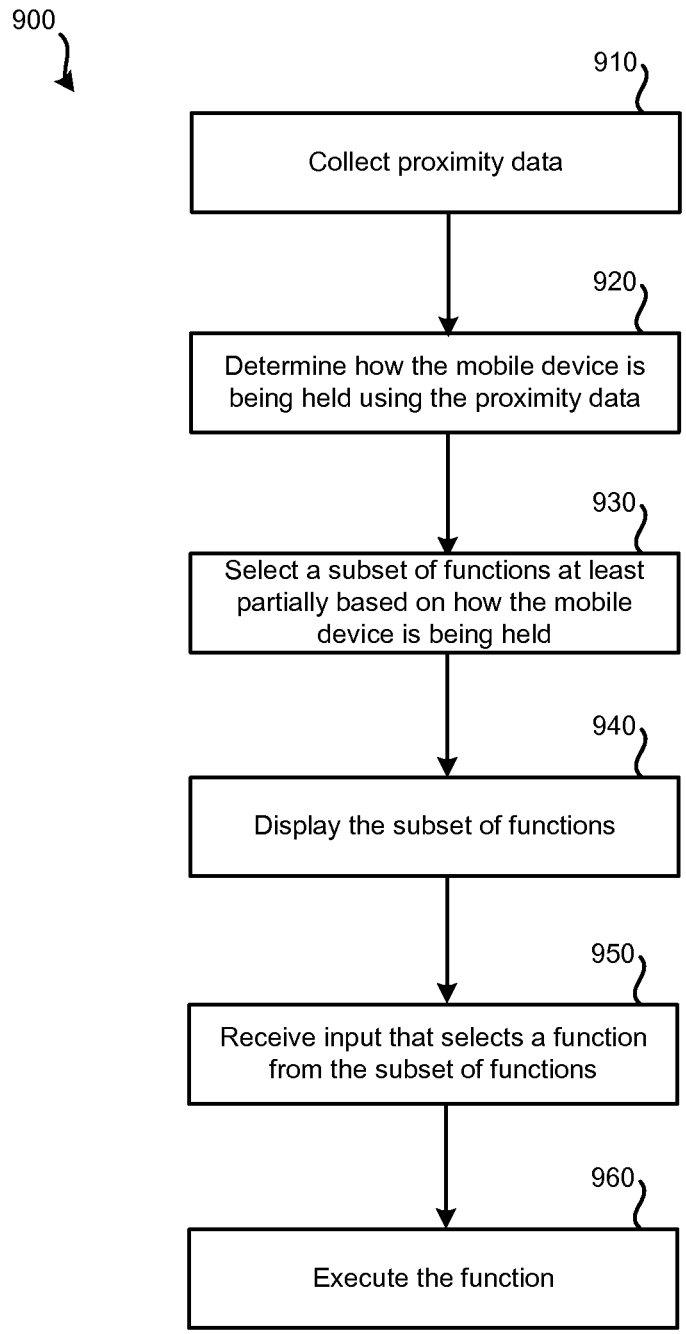
FIG. 9 illustrates an embodiment of a method for displaying a subset of functions based on proximity data and executing the function.

Rather than selecting a particular function for execution, the mobile device may select a subset of functions that the user may desire to execute. The user may then make the selection of the function to be executed from the subset. FIG. 9 illustrates an embodiment of a method 900 for displaying a subset of functions based on proximity data and executing the selected function.

Method 900 may be performed using system 100 or some other system that is configured to select a function for execution on a mobile device. The mobile device performing method 900 may be represented by the mobile devices of FIGS. 2A-3B or some other mobile device. Each step of method 900 may be performed by a mobile device and/or some component of a mobile device. As such, means for performing method 900 include a mobile device (e.g., a cellular phone, smartphone, gaming device, VoIP device) and components of such mobile devices, such as proximity sensors, displays, and/or processors. For some of the various steps or all of method 400, a display of the mobile device may remain off.

At step 910, proximity data may be collected. Such proximity data may be collected using one or more proximity sensors. Proximity data gathered may indicate whether or not a triggering entity, such as a part of the user's body, is proximate to one or more proximity sensors. Such proximity data may also indicate a magnitude. The magnitude may indicate how close the triggering entity, if present, is to the proximity sensor. A threshold value may be used for the magnitude such that if the magnitude is below the threshold, a triggering entity is not considered proximate to the proximity sensor; if the magnitude is greater than the threshold value, the triggering entity is considered proximate to the proximity sensor. By adjusting the threshold value, sensitivity to triggering entities may be increased or decreased. As such, when sensitivity is decreased, a triggering entity may need to be closer to the proximity sensor to be identified is proximate; when sensitivity is increased, the triggering entity may be able to be farther from the proximity sensor to be identified as proximate.

Using the proximity data collected at step 910, a determination is made as to how the mobile device is being held. At step 920, proximity data that indicates proximity to (or lack of proximity to) a triggering entity may be used to determine where the mobile device is and/or how the mobile device is being held. For example, proximity data may indicate whether the mobile device is being held with one or two hands, whether the mobile device is being held to an ear of the user, or whether the mobile device is being held by the corners of the device. Based on where the proximity sensors are located on the mobile device, other grip positions may be identified using proximity data.

At step 930, a subset of functions may be selected from the functions that can be performed by the mobile device. The functions present in the subset may be selected because they are typically performed when held in the position determined at step 920. Some or all functions of the mobile device may be associated with one or more positions for being held. As such, if the mobile device is determined to be held in a position that is linked with a function of the mobile device, the mobile device may be included in the subset selected at step 930.

At step 940, the subset of functions may be displayed and presented to a user via a display of the mobile device. The order of the functions may be based on when each function was last used, a preference selected by the user, number of times each function was used by the user, etc.

Whether as part of step 940 or some other method, the location of elements, such as icons, on the display of the mobile device may be determined, at least in part, based on proximity data (such as that received at step 910). Such elements may represent functions that are available for launch by the user. For instance, icons may be placed proximate to a hand of the user gripping the mobile device. Based on which hand of a user is determined to be holding the mobile device, the elements presented by the display of the mobile device may located in a different position on the display. For instance, elements may be displayed proximate to the hand holding the mobile device in order to make selection of a particular icon easier for the user via the same hand. This may be particularly useful if the mobile device is a tablet having a display of a size large enough that portions of the display may not be reachable by the user's hand that is being used to hold the mobile device.

Referring to FIG. 2C, if proximity data from proximity sensor 280 indicates proximity to a triggering entity, it may be determined that the user's left hand is holding the mobile device. If proximity data from a proximity sensor on the opposite side of the mobile device from proximity sensor 280 indicates proximity to a triggering entity, it may be determined that the user's right hand is holding the mobile device. In other embodiments, proximity data from other or additional proximity sensors may be used to determine which hand of a user is holding the mobile device.

Based on the display of the subset of functions at step 940, input may be received from a user at step 950 to select a function for execution from the subset. At step 960, the function selected from the subset may be executed.

It should be understood that while method 900 uses proximity data to create the subset, acceleration data may alternatively or additionally be used. Acceleration data may be used to determine a position of the mobile device in relation to the user, such as the angle at which the mobile device is being held. Just as various grip positions may be associated with particular functions, angles may be associated with functions. For example, a camera function may be associated with the mobile device being held vertically in front of the user, but a text messaging function may be associated with approximately a 45 degree angle (which may be approximately the angle at which a mobile device is held during typing). As such, the subset of step 930 may be created using proximity data and/or acceleration data.

Figure 10:
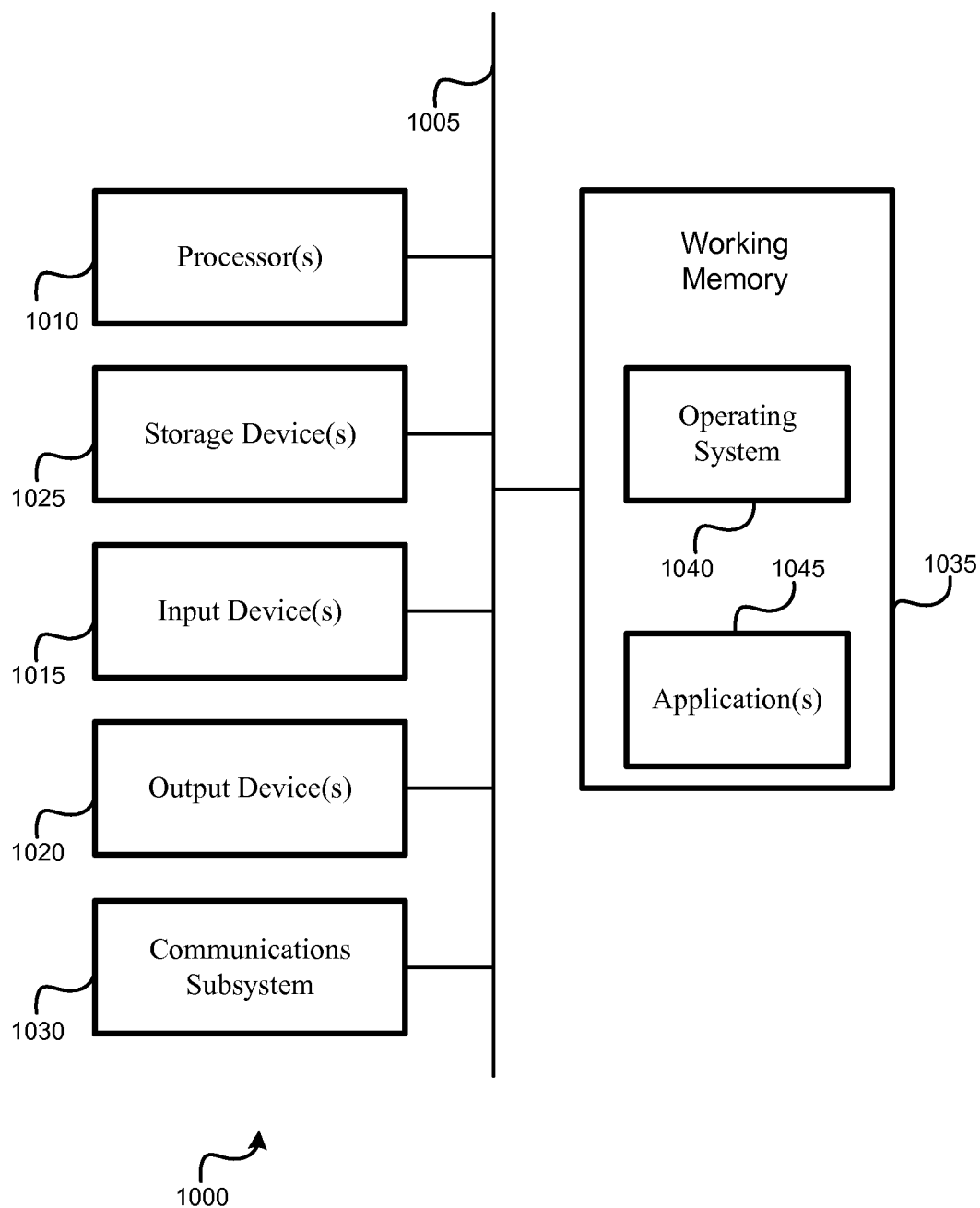
FIG. 10 illustrates an embodiment of a computer system.

FIG. 10 illustrates an embodiment of a computer system. A computer system as illustrated in FIG. 10 may be incorporated as part of the previously described mobile devices. For example, computer system 1000 can represent some of the components of the mobile devices discussed in this application. FIG. 10 provides a schematic illustration of one embodiment of a computer system 1000 that can be part of the system or device performing the methods provided by various other embodiments, as described herein. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for activating a speakerphone function of a mobile device during a call, the method comprising:
   participating in a voice connection over a telecommunications network;
   receiving proximity data from a proximity sensor while the voice connection is active, the proximity data indicating a proximity of a user of the mobile device to the mobile device;

determining whether the proximity data indicates that the mobile device is not proximate to the user; and activating the speakerphone function of the mobile device based on a determination that the proximity data indicates that the mobile device is not proximate to the user, the speakerphone function operable for the user to communicate via the voice connection over the telecommunications network.

2. The method of claim 1, further comprising:

receiving acceleration data from an accelerometer while the voice connection is active, the acceleration data indicating a vector towards the earth; and determining that the mobile device is facing away from the earth based on the acceleration data, wherein the speakerphone function is activated further based on a determination that the mobile device is facing away from the earth.

3. The method of claim 2, further comprising:

determining whether the mobile device is not in motion based on the acceleration data, wherein activating the speakerphone function is further based on a determination that the mobile device is not in motion.

4. The method of claim 1, further comprising:

selecting a subset of functions from a set of functions of the mobile device based on the proximity data, the subset of functions including the speakerphone function; and performing a function from the subset of functions other than the speakerphone function based on the determination that the proximity data indicates that the mobile device is not proximate to the user.

5. A mobile device for activating a speakerphone during a call, the mobile device comprising:

a first proximity sensor;

one or more speakers configured to output sound at a first volume and a second volume, the second volume being greater than the first volume;

a microphone; and a processor configured to:

participate in a voice connection over a telecommunications network, receive first proximity data from the first proximity sensor while the voice connection is active, the proximity data indicating a proximity of a user of the mobile device to the mobile device, determine whether the proximity data indicates that the mobile device is not proximate to the user, and induce the one or more speakers to output sound at the second volume based on a determination that the proximity data indicates that the mobile device is not proximate to the user, the inducement of the one or more speakers to output sound at the second volume operable for the user to communicate via the voice connection over the telecommunications network.

6. The mobile device of claim 5, further comprising:

a second proximity sensor coupled to the processor; and wherein the processor is further configured to:

receive additional proximity data from the second proximity sensor, determine whether the additional proximity data indicates that the mobile device is not proximate to the user, and induce the one or more speakers to output sound at the second volume based on a further determination that the additional proximity data indicates that the mobile device is not proximate to the user.

7. The mobile device of claim 6, wherein the proximity data from the first proximity sensor indicates a proximity to an ear of the user and the additional proximity data indicates a proximity to an appendage of a user.

8. The mobile device of claim 5, further comprising:

a touchscreen display coupled to the processor, wherein the processor is further configured to display a speakerphone function indicator on the touchscreen display based on the determination that the proximity data indicates that the mobile device is not proximate to the user.

9. The mobile device of claim 5, wherein the proximity data is used to determine a magnitude indicating how close the user is to the mobile device, and wherein the processor determines that the proximity data indicates that the mobile device is not proximate to the user by comparing the magnitude to a threshold value.

10. A non-transitory computer-readable medium, having instructions stored therein that, when executed by a processor of a mobile device, cause the processor to:

participate in a voice connection over a telecommunications network;

receive proximity data from a proximity sensor while the voice connection is active, the proximity data indicating a proximity of a user of the mobile device to the mobile device;

determine whether the proximity data indicates that the mobile device is not proximate to the user; and activate a speakerphone function of a mobile device based on determining that the proximity data indicates that the mobile device is not proximate to the user, the speakerphone function operable for the user to communicate via the voice connection over the telecommunications network.

11. The non-transitory computer-readable medium of claim 10, having further instructions stored therein, that, when executed by the processor of the mobile device, cause the processor to:

receive acceleration data from an accelerometer while the voice connection is active, the acceleration data indicating a vector towards the earth; and determine that the mobile device is facing away from the earth based on the acceleration data, wherein the speakerphone function is activated further based on a determination that the mobile device is facing away from the earth.

12. The non-transitory computer-readable medium of claim 11, having further instructions stored therein, that, when executed by the processor of the mobile device, cause the processor to:

determine whether the mobile device is not in motion based on the acceleration data, wherein the speakerphone function is activated further based on a determination that the mobile device is not in motion.

13. The non-transitory computer-readable medium of claim 11, having further instructions stored therein, that, when executed by the processor of the mobile device, cause the processor to:

select a subset of functions from a set of functions of the mobile device based on the proximity data, the subset of functions including the speakerphone function; and perform a function from the subset of functions other than the speakerphone function device based on the determination that the proximity data indicates that the mobile device is not proximate to the user.

14. A system for activating a speakerphone function of a mobile device during a call, the system comprising:

means for participating in a voice connection over a telecommunications network;

means for receiving proximity data from a first proximity sensor while the voice connection is active, the proximity data indicating a proximity of a user of the mobile device to the mobile device;

means for determining whether the proximity data indicates that the mobile device is not proximate to the user; and means for activating the speakerphone function of the mobile device based on a determination that the proximity data indicates that the mobile device is not proximate to the user, the speakerphone function operable for the user to communicate via the voice connection over the telecommunications network.

15. The system of claim 14, further comprising:

means for receiving additional proximity data from a second proximity sensor; and means for determining whether the additional proximity data indicates that the mobile device is not proximate to the user, wherein the speakerphone function is activated further based on a determination that the additional proximity data indicates that the mobile device is not proximate to the user.

16. The system of claim 15, wherein the proximity data from the first proximity sensor indicates a proximity to an ear of the user and the additional proximity data indicates a proximity to an appendage of a user.

17. The system of claim 14, further comprising:

means for displaying a speakerphone function indicator on a display of the mobile device based on the determination that the proximity data indicates that the mobile device is not proximate to the user.

18. The system of claim 14, wherein the proximity data is used to determine a magnitude indicating how close the user is to the user, and wherein determining that the proximity data indicates that the mobile device is not proximate to the user includes comparing the magnitude to a threshold value.

* * * * *